(12) United States Patent
Mendez et al.

(10) Patent No.: US 10,089,776 B2
(45) Date of Patent: Oct. 2, 2018

(54) GRAPHICS PROCESSING SYSTEMS

(71) Applicant: ARM Limited, Cambridge (GB)

(72) Inventors: Roberto Lopez Mendez, Cambridge (GB); Sylwester Krzysztof Bala, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/247,272

(22) Filed: Aug. 25, 2016

(65) Prior Publication Data

US 2017/0069129 A1 Mar. 9, 2017

(30) Foreign Application Priority Data

Sep. 4, 2015 (GB) .................................. 1515723.3

(51) Int. Cl.
*G06T 15/04* (2011.01)
*G06T 15/08* (2011.01)

(52) U.S. Cl.
CPC .............. *G06T 15/04* (2013.01); *G06T 15/08* (2013.01); *G06T 2210/12* (2013.01)

(58) Field of Classification Search
CPC ...... G06T 15/04; G06T 15/08; G06T 2210/12
See application file for complete search history.

(56) References Cited

U.S. PATENT DOCUMENTS 6,563,508 B1 5/2003 Oka
6,876,362 B1 4/2005 Newhall
(Continued)

FOREIGN PATENT DOCUMENTS

CA 2737575 10/2012
EP 1508877 2/2005
(Continued)

OTHER PUBLICATIONS

Nashita, et al., "A shading model for atmospheric scattering considering luminous intensity distribution of light sources", ACM, Computer Graphics, vol. 21, No. 4, Jul. 1987, pp. 303-310. (Year: 1987).*

(Continued)

*Primary Examiner* — William A Beutel
(74) *Attorney, Agent, or Firm* — Vierra Magen Marcus LLP

(57) ABSTRACT

In a graphics processing system, a bounding volume 20 representing the volume of a scene to be rendered and a cube texture 30 representing the transparency of the surface of the bounding volume are defined. Then, when the scene is to be rendered for output, a color to be used to represent a first sampling point 25 as seen from a viewpoint position 24 for the scene is determined by determining, for each of plural second sampling points 27 along a vector 26 from the first sampling point 25 to the viewpoint position 24, a transparency parameter indicative of the amount of light that falls on the second sampling point 27, and then using the determined transparency parameter values for each of the plural second sampling points 27 to determine the color. Each transparency parameter is determined by determining a vector 29 to be used to sample a graphics texture 30 that represents the transparency of the surface of the bounding volume 20 in the scene, and then using the determined vector 29 to sample the graphics texture 30 to determine the transparency parameter value for the light source 22 for the second sampling point 27.

21 Claims, 11 Drawing Sheets

(56) References Cited

U.S. PATENT DOCUMENTS

| | | | | |
|---|---|---|---|---|
| 6,999,078 | B1* | 2/2006 | Akerman | G06T 15/06 345/424 |
| 8,773,433 | B1* | 7/2014 | Smyrl | G06T 15/506 345/420 |
| 9,842,424 | B2* | 12/2017 | Hecht | G06T 15/08 |
| 2005/0041023 | A1* | 2/2005 | Green | G06T 15/04 345/426 |
| 2005/0093857 | A1 | 5/2005 | Wang et al. | |
| 2007/0257911 | A1 | 11/2007 | Bavoil | |
| 2008/0024491 | A1 | 1/2008 | Sathe et al. | |
| 2009/0213144 | A1* | 8/2009 | Dokken | G06T 15/06 345/660 |
| 2012/0094773 | A1* | 4/2012 | Suzuki | A63F 13/655 463/43 |
| 2015/0228110 | A1* | 8/2015 | Hecht | G06T 15/08 345/419 |
| 2015/0269768 | A1* | 9/2015 | Sohn | G06T 15/08 345/424 |
| 2017/0161917 | A1 | 6/2017 | Bala et al. | |
| 2018/0033191 | A1 | 2/2018 | Mendez | |

FOREIGN PATENT DOCUMENTS

| | | |
|---|---|---|
| GB | 2528655 A | 2/2016 |
| GB | 2543766 A | 5/2017 |
| JP | 2011-1138445 A | 7/2011 |
| KR | 100700307 B1 | 3/2007 |
| WO | WO 2008/037599 | 4/2008 |
| WO | 2017072476 A1 | 5/2017 |

OTHER PUBLICATIONS

Search Report dated Feb. 1/1, 2016, UK Patent Application No. GB1515723.3.

Engelhardt, "Epipolar Sampling for Shadows and Crepuscular Rays in Participating Media with Single Scattering," Proceedings of the 2010 Symposium on Interactive 3D Graphics and Games.

Kenny Mitchell, "Volumetric Light Scattering as a Post-Process," GPU Gems 3, 2008, NVIDIA Corporation, http://http.developer.nvidia.com/GPUGems3/gpugems3_ch13.html.

Skals, "Real-time Scattering," Feb. 28, 2012, www2.imm.dtu.dk/pubdb/views/.../imm6267.pdf.

Toth, et al., "Real-time Volumetric Lighting in Participating Media," The Eurographics Association 2009, http://sirkan.iit.bme.hu/~szirmay/lightshaft_link.htm.

Mitchell, "Light Shafts: Rendering Shadows in Participating Media," ATI Research, Inc., Game Developers Conference 2004.

Dobashi, et al., "Interactive Rendering Method for Displaying Shafts of Light," 2000, http://ime.ist.hokudai.ac.jp/~doba/papers/pg00.pdf.

Prast, et al., "Caustics, Light Shafts, God Rays," Institute of Computer Graphics and Algorithms, Vienna, University of Technology, Feb. 2013, https://old.cg.tuwien.ac.at/research/publications/2013/Prast_Stefanie_2013-CLG/Prast_Stefanie_2013-CLG-Thesis.pdf.

Keller, et al., "Interleaved Sampling," Proceedings of the 12th Eurographics Workshop on Rendering Techniques, London, UK, 2001, http://cs.ubc.ca/labs/imager/tr/2001/keller2001a/keller.2001a.pdf.

Shin, et al., "Rendering Particles in a Shaft of Light," http://www.csee.umbc.edu/~olano/class/635-11-2/shin7.pdf.

Nilsson, "Two Hybrid Methods of Volumetric Lighting," Lund University, Mar. 20, 2008, http://fileadmin.cs.lth.se/graphics/theses/projects/volumetric/thesis.pdf.

"White Paper: Volume Light," NVIDIA Corporation, Jan. 2008, http://developer.download.nvidia.com/SDK/10.5/direct3d/Source/VolumeLight/doc/VolumeLight.pdf.

PCT International Search Report and Written Opinion dated 4/292016, in PCT Patent Application No. PCT/GB20161050498.

GB Search Report dated Aug. 25, 2015, GB Patent Application No. GB1503386.3.

GB Search Report dated Aug. 25, 2015, GB Patent Application No. GB1503391.3.

Behc, "Box Projected Cubemap Environment Mapping," Graphics and GPU Programming, Apr. 20, 2010.

Bjorke, "Image-Based Lighting," GPU Gems, Chapter 19, Nvidia Corporation, 2004.

"Environment Mapping Techniques," The Cg Tutorial, Chapter 7, Nvidia Corporation, 2003.

Ihrke, et al, "Eikonal Rendering: Efficient Light Transport in Refractive Objects," SIGGRAPH 2007 Conference Aug. 2007.

Sebastien Lagarde, Version 1.28 Living blog on "Image-based Lighting approaches and parallax-corrected cubemap, SIGGRAPH 2012," seblarde.wordpress.com, Sep. 29, 2012.

Sousa, "Generic Refraction Simulation," GPU Gems, Chapter 19, Nvidia Corporation, 2005.

Nishita, "A Shading Model for Atmospheric Scattering Considering Luminous Intensity Distribution of Light Sources", ACM, Computer GRaphics, vol. 21, No. 4, Jul. 1987, pp. 303-310.

Combined Search and Examination Report dated Feb. 25, 2016, UK Patent Application No. GB1518908.7.

International Search Report and Written Opinion dated Nov. 7, 2016, in International Patent Application No. PCT/GB2016/052432.

Laszlo Szirmay-Kalos et al., "Approximate Ray-Tracing on the GPU with Distance Impostors", Computer Graphics Forum, vol. 24, No. 3, Sep. 1, 2005, pp. 695-704.

Mendez, "Reflections Based on Local Cubemaps in Unity", ARM Mali Graphics 2014. Aug. 7, 2014, pp. 1-19.

Laszlo Szirmay-Kalos et al., "Specular Effects on the GPU: State of the Art", Computer Graphics Forum, vol. 28, No. 6, Sep. 1, 2009, pp. 1586-1617.

Lagarde et al., "Local Image-Based Lighting with Parallax-Corrected Cubemap", GamesConnection, Nov. 30, 2012.

Li, et al., "Real-Time Reflection Using Ray Tracing with Geometry Field", Eurographics 2006 Conference, Short Japers, Sep. 4, 2006, Vienna, Austria.

PCT International Search Report and Written Opinion dated Jan. 25, 2016, in PCT Patent Application PCT/GB2015/052054.

Friedrich A. Lohmueller: "Textures with POV-Ray—Transparency mapping I", Jan. 20, 2013 (Jan. 20, 2013), XP055235051, Retrieved from the Internet: URL:https://web.archive.org/web/20130120200610/ http://f-lohmueller.de/pov_tut/tex/tex_885e.htm, the whole document figures 1-3.

Friedrich A. Lohmueller: "Textures with POV-Ray—Transparency mapping II", Jan. 20, 2013 (Jan. 20, 2013) XP055235064, Retrieved from the Internet: URL:https://web.archive.org/web/20130120200631/ http://f-lohmueller.de/pov_tut/tex/tex_886e.htm—the whole document.

Sebastien Lagarde, et al: "Local image-based lighting with parallax-corrected cubemaps", SIGGRAPH '12 ACM SIGGRAPH 2012 Talks, ACM, 2 Penn Plaza, Suite 701 New York NY 10121-0701 USA, Aug. 5, 2012 (Aug. 5, 2012), p. 1, XP058008298, DOI: 10.1145/2343045.2343094 ISBN: 978-1-4503-1683-5 the whole document abstract.

GB Search Report dated Jan. 21, 2015, GB Patent Application No. GB1413145.2.

Bunnell, et al., Chapter 11. Shadow Map Antialiasing, Sep. 2007, Retrieved from the Internet: URL: http://http.developer.nvidia.com/GPUGems/gpugems_ch11.html.

Bjorke, Chapter 19. Image Based Lighting, Sep. 2007, Retrieved from the Internet: URL: http://http.developer.nvidia.com/GPUGems/gpugems_ch19.html.

Tutorial on Shadow Mapping, Paul's Projects, 2002/2003 Retrieved from the Internet: URL: http://www.paulsprojects.net/tutorials/smt/smt.html.

Everitt, "Projective Texture Mapping," Nvidia, Dec. 2015, Retrieved from the Internet: URL: www.cse.unsw.edu.au/~cs9018/readings/projective_texture_mapping.pdf.

U.S. Appl. No. 15/770,322 filed Apr. 23, 2018.

* cited by examiner

GRAPHICS PROCESSING SYSTEMS

BACKGROUND

The technology described herein relates to graphics processing systems and in particular to methods of and apparatus for taking account of the effect of light shafts when rendering images for display.

When rendering images, such as output frames, for display in graphics processing systems, it is often desirable to be able to take account of the effect of light shafts in the scene being rendered. Light shafts can occur, for example, when light passes through a light-scattering medium. Various rendering techniques have been developed to try to do this.

One such technique involves placing a geometric object that represents the light shaft in the scene. The object is rendered as a transparent object and blended with the rest of the scene to give the appearance of a light shaft. However, this technique does not always give realistic results, for example when the viewpoint (camera) position for the scene is close to or inside of the light shaft. In addition, the light shaft can appear to have "hard" edges. Furthermore, the geometric object must be reconstructed whenever the light position changes.

Other techniques for taking into account the effects of light shafts make use of so-called "shadow maps" or light-space sampling planes. Generally in these techniques, one or more textures that are indicative of the light shaft(s) as seen from the viewpoint (camera) position for the scene are derived (e.g. in one or more first rendering passes), and then used when rendering the output frame to modify the scene so that the light shaft(s) are displayed.

While the use of these techniques can be effective for allowing the effect of light shafts to be taken account of in a realistic manner when rendering images, the need to first prepare, and then store and use, one or more textures in these arrangements means that they can become very expensive (e.g. in terms of memory and bandwidth resources), particularly if there are plural light sources that need to be considered. It can also be necessary to regenerate the texture(s) whenever the light or viewpoint (camera) position changes (which can happen each frame). These techniques can also suffer from pixel instabilities/flickering, e.g. when the viewpoint (camera) position moves.

The Applicants believe therefore that there remains scope for improved techniques for rendering light shafts in graphics processing systems.

BRIEF DESCRIPTION OF THE DRAWINGS

A number of embodiments of the technology described herein will now be described by way of example only and with reference to the accompanying drawings, in which.

Like reference numerals are used for like components where appropriate in the drawings.

DETAILED DESCRIPTION

Figure 1:
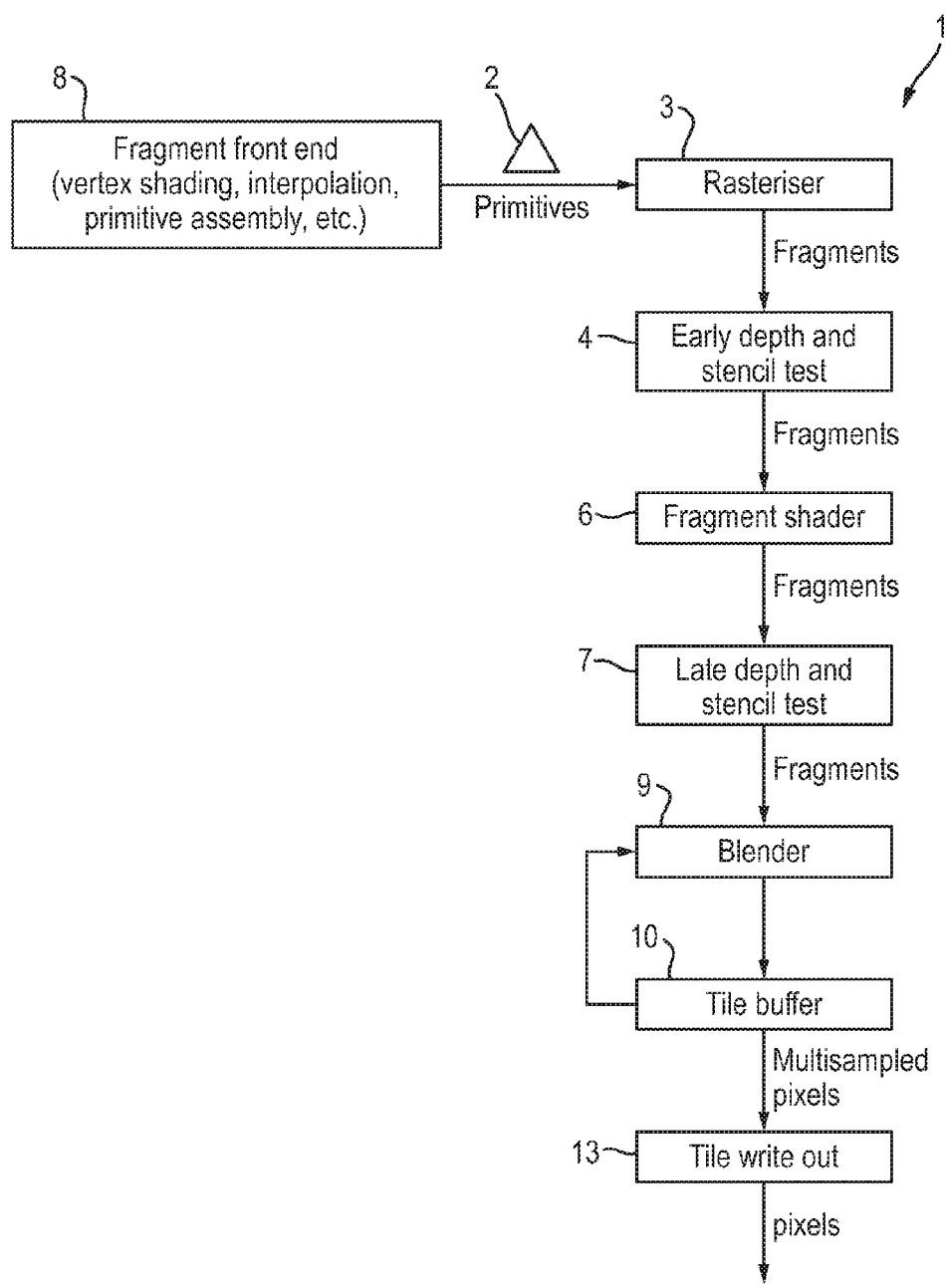
FIG. 1 shows schematically a graphics processing pipeline that can be operated in the manner of the technology described herein.

A first embodiment of the technology described herein comprises a method of operating a graphics processing system when rendering a scene for output, in which a bounding volume representative of the volume of all or part of the scene to be rendered is defined; the method comprising:

for at least one first sampling point on or within the bounding volume, determining a colour to be used to represent that sampling point as seen from a viewpoint position for the scene by:

for each of plural second sampling points along a vector from the first sampling point to the viewpoint position for the scene, determining a transparency parameter indicative of the amount of light that falls on the second sampling point from a light source that is external to the bounding volume by:

determining a vector to be used to sample a graphics texture that represents the transparency of the surface of the bounding volume in the scene; and using the determined vector to sample the graphics texture to determine a transparency parameter value for the light source for the second sampling point; and using the determined transparency parameter values for each of the plural second sampling points to determine the colour to be used to represent the first sampling point as seen from the viewpoint position for the scene.

A second embodiment of the technology described herein comprises a graphics processing unit comprising:

processing circuitry configured to, for at least one first sampling point on or within a bounding volume representative of the volume of all or part of the scene to be rendered, determine a colour to be used to represent that sampling point as seen from a viewpoint position for the scene by:

for each of plural second sampling points along a vector from the first sampling point to the viewpoint position for the scene, determining a transparency parameter indicative of the amount of light that falls on the second sampling point from a light source that is external to the bounding volume by:

determining a vector to be used to sample a graphics texture that represents the transparency of the surface of the bounding volume in the scene; and using the determined vector to sample the graphics texture to determine a transparency parameter value for the light source for the second sampling point; and using the determined transparency parameter values for each of the plural second sampling points to determine the colour to be used to represent the first sampling point as seen from the viewpoint position for the scene.

The technology described herein is directed to a method of and apparatus for taking account of the effect of light shafts when rendering a scene for output and in particular in the situation where there is a light source that is external to a defined bounding volume within the scene. To determine the effect of light shafts in the bounding volume due to the light source, for at least one "first" (screen space) sampling point for the scene, plural transparency parameters are respectively determined for each of plural "second" (intermediate) sampling points along (on) a vector from the first sampling point to the viewpoint (camera) position for the scene. The transparency parameters are each indicative of the amount of light falling on the second sampling point in question from the light source, and are determined using a texture representative of the transparency of the surface of the bounding volume. The plural transparency parameters are used to determine the colour to be used to represent the first sampling point as seen from the viewpoint position for the scene, i.e. as seen through the light shaft.

As will be discussed further below, the Applicants have recognised that this arrangement can be used to realistically simulate the effect of a light shaft due to a light source external to a bounding volume in a particularly efficient manner. In particular, since the technique of the technology described herein can be (and in an embodiment is) used to determine a volumetric light shaft "contribution" to the colour to be used to represent the first sampling point as seen from the viewpoint position for the scene, it does not suffer from the problems associated with the conventional geometric approaches e.g. when the viewpoint (camera) position for the scene is close to or inside of the light shaft (in contrast, the techniques of the technology described herein can provide realistic results in these situations).

Furthermore, the Applicants have recognised that the arrangement of the technology described herein can be used to simulate the effect of light shafts due to light sources external to a bounding volume using a single "static" graphics texture that represents the transparency of the surface of the bounding volume. This then means that, for example, the same graphics texture can be used for multiple frames, even if the viewpoint (camera) position and/or the position of the light changes. Also, that same texture can be used to assess the light shafts due to all light sources that are external to the bounding volume (rather than there needing to be, e.g., a separate texture or geometric object per light source).

Because the technology described herein uses a "static" texture to simulate the light shaft effect, rather than using "dynamic" textures, that also means that the texture of the technology described herein can be generated in much higher quality, and using more sophisticated effects. The texture can, for example, be generated "offline" and subjected to non-real-time optimisations, and then provided for use by the graphics processing system. Because a single "static" texture can be used in the technology described herein for a given bounding volume, it is also possible to provide the texture in a compressed form, if desired, thereby providing bandwidth and memory savings.

The technology described herein accordingly provides a memory and bandwidth efficient technique for handling situations where light shafts are present, while also providing enhanced rendering quality.

The technology described herein is concerned with the situation where light shafts are present within a bounding volume for a scene due to a light source that is external to the bounding volume. The bounding volume could represent the entire scene that is being rendered (and in one embodiment this is the case), but it would also be possible for the bounding volume to represent only a part of the scene. The bounding volume may, for example, represent a room, e.g. that contains a light-scattering medium such as dust or fog.

The bounding volume can be defined in any desired and suitable manner. It is in an embodiment defined in world space. It can take any suitable and desired form, but is in an embodiment in the form of a bounding box (a cube). Other arrangements for the bounding volume would, of course, be possible.

The graphics texture that represents the transparency of the surface of the bounding volume can take any suitable and desired form. In an embodiment it is in the form of a texture that is used for environment mapping, such as a cube texture (cube map) or a sphere texture (sphere map).

Thus, in an embodiment, the texture that represents the transparency of the surface of the bounding volume comprises a texture that indicates and stores for points on a surface that surrounds a reference position within the volume that the texture encompasses, a transparency value for each point. The texture is in an embodiment sampled based on a vector (direction) from the reference position for the texture (that the texture is defined with respect to).

In other words, the texture in an embodiment stores a transparency value for respective directions from a reference position (point) within the volume that the texture represents, and is sampled by determining a direction from the reference position (point) within the texture to a position on the surface that the texture represents.

The reference position (point) within the texture that the texture is defined (and sampled) with respect to is in an embodiment at the centre of the volume that the texture encompasses, but other arrangements would, of course, be possible, if desired.

The texture representing the transparency of the surface of the bounding volume is in an embodiment configured to correspond to the bounding volume for the scene. Thus, for example, where the bounding volume is in the form of a cube, the texture is in an embodiment in the form of a cube texture (a cube map). In an embodiment, the texture is a cube texture (a cube map).

Correspondingly, the texture in an embodiment has a resolution that will be suitable for the anticipated size of the bounding volume that it is to be used with (although this is not essential, and the texture could, e.g., be scaled for use, if required).

The texture should, and in an embodiment does, store transparency values (alpha values) indicative of the transparency of the surface of the bounding volume in the scene in the relevant direction from the reference point within the volume that the texture is defined in relation to. Thus, for example, where the bounding volume surface is to be opaque in a given direction, the texture transparency (alpha) values for that direction from the reference point should be set to a value to indicate that the surface is opaque in that direction (e.g. "1"). Correspondingly, for those directions from the reference point where the surface is completely transparent, a transparency (alpha) value indicative of complete transparency (e.g. "0") should be stored in the texture. For semi-transparent surface regions, transparency (alpha) values indicative of semi-transparency, i.e. between "0" and "1", can be used. In this way, the texture can be used to represent the full range of transparency from completely transparent to completely opaque. (The alpha values in the texture will, as will be appreciated by those skilled in the art, essentially represent how much light from the light source is transmitted by the surface (the light intensity) at the point (from the direction) in question.)

The texture could store the transparency values alone (i.e. be a single channel texture, storing a single transparency (alpha) channel only). Alternatively, the texture could also store other data channels, such as colour channels (e.g. be an RGBα texture (and in an embodiment, this is done)). In this case, the non-transparency (alpha) data channels could be used to store an environment texture that is to be used for different purposes. For example, an RGBα texture could be used to store a texture to be used in the manner of the technology described herein in the alpha channel, and also to store a second texture for other purposes in the RGB colour channels. This would then allow the same, e.g. cube, texture to be used for multiple purposes.

It would also or instead be possible to generate and use another (separate) colour (e.g. RGB) texture for these purposes.

In an embodiment where the texture also (or the other texture) includes colour channels, those colour channels are also used in the method of the technology described herein, for example as a further, colour, parameter to be used when calculating the light shaft effect. This would then allow the effect of tinted (coloured) semi-transparent surfaces (e.g. stained glass windows) to be simulated and taken into account when calculating the effect of light shafts within the bounding volume.

Thus, in an embodiment, the texture (or the other texture) stores colour (RGB) values indicative of the colour of the surface of the bounding volume in the scene in the relevant direction from the reference point within the volume that the texture is defined in relation to.

The texture is in an embodiment generated by rendering an image of a surface for the bounding volume from the viewpoint of the reference position for the texture (from the texture reference position). The generated texture may be stored, e.g. on an appropriate portable storage medium, such as a DVD, or in memory, for future use by a graphics processing unit, when it is desired to use the texture when rendering, e.g., an image.

In an embodiment, the texture is stored (encoded) as a set of mipmaps (i.e. where multiple versions of the original texture each having different levels of detail (resolution) are stored for use).

The texture may be generated in "real-time" (at runtime), i.e. as and when it is needed, but in an embodiment the texture is generated in advance of its requirement, e.g. "offline".

In an embodiment, the texture is subject to one or more processing operations after it has been generated (and before it is stored for use), such as, and in an embodiment, one or more filtering processes, such as having one or more convolution filters applied to it. In an embodiment the texture is subjected to one or more of: blurring; brightness processing; contrast processing (e.g. enhancement); sharpening, etc. In an embodiment, the texture is subjected to one or more non-real-time optimisations. (As discussed above, a particular advantage of the technology described herein is that because the texture that is used to represent the transparency values is, in effect, a "static" texture, it does not need to be generated in real-time, and can therefore, accordingly, be subjected to one or more non-real-time optimisations, if desired.)

In an embodiment, the texture is also compressed before it is stored. Any suitable texture compression process can be used for this.

In an embodiment, as well as generating the texture, the bounding volume that the texture represents (is to be used with) is also generated and stored. This bounding volume should, and in an embodiment does, represent the volume of all or part of a scene to be rendered that the texture is to be used in conjunction with.

In an embodiment data defining the bounding volume that the texture is to be used in conjunction with is generated and stored in association with (associated with) the texture. The bounding volume is in an embodiment defined in world space and is in an embodiment aligned to the transparency-indicating texture. Again, this bounding volume information can be subject to any desired post-processing operations, such as compression, if desired.

As discussed above, the transparency indicating texture is in an embodiment generated by rendering an image that will represent the surface of the bounding volume from the viewpoint of the reference position for the texture. This is in an embodiment done by sampling respective positions on the surface (the image representing the surface) for respective positions on the bounding volume (in the relevant direction from the reference position for the texture). In this process, as the bounding volume will typically be an approximation of the actual scene (e.g. room) being defined, the bounding volume may not match exactly to the surface of the scene (e.g. room) being defined (e.g. where the, e.g. walls of the room may be uneven or have surface roughness). To allow for this when generating the texture, the points of the surface that are sampled for the texture (for each texel), can be, and are in an embodiment, allowed to, fall on, outside of or inside the bounding volume (rather than the sampling points being constrained to be on the walls of the bounding volume). This will avoid holes being introduced within the texture where the bounding volume does not match exactly with the scene geometry. The surface is in an embodiment sampled at a position as close to the corresponding position on the bounding volume (in the relevant direction from the reference position for the texture) as possible, as the further a sampling point is from the bounding volume, the greater the error that will be introduced when using the texture, particularly when making a local correction (as described below). Accordingly, the bounding volume is in an embodiment defined such that it matches the scene (the surface defining the scene) closely (in an embodiment as closely as possible), such that the texture can be generated using samples near to (as near as possible to) the walls of the bounding volume.

In an embodiment, plural textures, and, in an embodiment, corresponding bounding volumes, are generated and stored, e.g. for respective scenes that is anticipated may be displayed when executing the application, e.g. game, that the textures and scenes relate to. For example, where a game will include plural scenes, such as rooms, that could have external light sources, in an embodiment respective transparency-indicating textures and bounding volumes are generated for each scene (e.g. room) that could fall to be displayed when the game is played. The textures and bounding volumes can then be stored, e.g., with the remaining game data for use when the game is being executed.

As discussed above, in the technology described herein, in order to determine a colour to be used to represent a first sampling point as seen from the viewpoint (camera) position for the scene (i.e. as seen through a light shaft), a transparency parameter is determined for each of plural "second" sampling points along a vector from the first sampling point to the viewpoint position for the scene. That is, for the first sampling point, plural transparency parameters are in an embodiment respectively determined for each of plural second sampling points along (on) the first sampling point to viewpoint vector, e.g. in a "ray marching" process.

The vector from the first sampling point to the viewpoint position for the scene is in an embodiment defined in world space. As will be appreciated, this vector is equivalent to the vector from the viewpoint position for the scene to the first sampling point.

The first sampling point should be (and in an embodiment is) a screen space sampling point (e.g. a fragment), e.g. of an array of plural first (screen space) samplings points (fragments), i.e. for which it is required to determine an (output) colour in the rendering process (i.e. as seen through the light shaft).

The second sampling points should be (and in an embodiment are) a set of "intermediate" sampling points along (on) the first sampling point to viewpoint vector, i.e. which are used in the "ray marching" process.

The second sampling points for which transparency parameters are determined can comprise any suitable and desired set of sampling points along (on) the sampling point to viewpoint vector. The number of second sampling points to be used can be selected as desired. As will be appreciated, using more second sampling points will result in more accurate results for the light shaft calculation, but at the expense of requiring more resources (and vice versa).

Equally, the locations of the second sampling points along (on) the sampling point to viewpoint vector can be selected as desired. The second sampling points are in an embodiment located at regularly (equidistant) intervals, and in an embodiment spread out, along the first sampling point to viewpoint vector, although it would also be possible to use irregular intervals. It would also be possible to use relatively more second sampling points in regions where it is known or expected that the light shaft will be present (and to use relatively fewer or no second sampling points in other regions).

The plural transparency parameters for the plural second sampling points may be determined in any suitable and desired order. For example, they may be determined one-by-one, e.g. progressively from one end of the sampling point to viewpoint vector to the other (e.g. from the sampling point to the viewpoint or from the viewpoint to the sampling point), and/or some or all of the transparency parameters may be determined in parallel.

As will be described in more detail below, the technique of the technology described herein is in an embodiment performed for plural (in an embodiment all) first sampling points of the array of first sampling points (e.g. by determining transparency parameters along respective first sampling point to viewpoint vectors). Corresponding second sampling point locations along the respective sampling point to viewpoint vectors can be used for some or all of the array of first sampling points. However, in an embodiment, this is not done, and the second sampling point locations along (on) the respective first sampling point to viewpoint vectors are in an embodiment different (do not correspond) for respective (adjacent) first (screen space) sampling points. For example, it would be possible to start the "ray marching" process from (slightly) different positions (distances) along respective (adjacent) first sampling point to viewpoint vectors, and to then e.g. use a constant second sampling point spacing in the "ray marching" process, i.e. to use interleaved sampling (and in one embodiment, this is done). As will be appreciated by those having skill in the art, this can avoid "banding" artefacts across adjacent first sampling points due to the quantised nature of the ray marching process.

Other arrangements would, of course, be possible.

As discussed above, in the technology described herein, for each second sampling point, a transparency parameter is determined by sampling the transparency representing graphics texture. The vector to be used to sample the transparency representing graphics texture can be determined in any suitable and desired manner.

In an embodiment, the vector to be used to sample the transparency representing graphics texture is determined by firstly determining the position on the bounding volume intersected by a vector from the second sampling point to the light source, and then using the intersection position to determine the vector to be used to sample the graphics texture.

In this embodiment, the position on the bounding volume intersected by the vector from the second sampling point (for which the transparency parameter is required) to the light source (for which the transparency parameter is being determined) can be determined as desired. In an embodiment, the vector from the second sampling point to the light source position (in world space) is determined, and the intersection point on the bounding volume of that vector from the second sampling point to the light source is then determined.

The vector to be used to sample the transparency representing graphics texture can then be determined using the intersection position in any suitable and desired manner. For example, the vector from the second sampling position to the intersection point could simply be used as the vector that is used to sample the graphics texture.

However, the Applicants have recognised that where the graphics texture is defined with reference to a reference position (e.g. the centre point) within the volume that the graphics texture corresponds to, then simply using the vector from the second sampling position of interest to the intersection point on the bounding volume will not always sample the graphics texture correctly. Thus, in an embodiment, the sampling process involves accounting for (compensating for) the fact that the texture is defined with reference to a reference point that may not correspond to the second sampling position being considered.

This compensation can be performed as desired but in an embodiment, the vector from the reference position that the texture is defined with respect to, to the determined intersection point on the bounding volume is determined, and then that vector is used to sample the transparency-indicating texture. This will ensure that the correct position in the texture is sampled, even if the second sampling position does not correspond to the reference position that the texture is defined with respect to. It, in effect, applies a "local" correction to the vector from the second sampling position being considered to the light source.

In other words, the determined intersection position on the bounding volume is used to determine a vector from the texture reference position (e.g. centre point) to the determined intersection point, and then that vector from the reference position to the determined intersection point is used to sample the transparency-indicating texture.

These processes (for determining the vector to be used to sample the graphics texture) can be carried out by any desired and suitable stage or component of the graphics processing unit. In an embodiment they are performed by a fragment shading stage (a fragment shader) of the graphics processing unit, in an embodiment by executing an appropriate fragment shading program.

It would also be possible to perform at least some of the processes for determining the vector to be used to sample the graphics texture by a vertex shading stage (a vertex shader) of the graphics processing unit, in an embodiment by executing an appropriate vertex shading program (and in one embodiment this is done).

In an embodiment, a set of texture sampling vectors is determined and then the vector to be used to sample the transparency representing graphics texture is determined by interpolation using the set of texture sampling vectors.

The set of texture sampling vectors in an embodiment comprises plural texture sampling vectors determined for a limited number of ("third"), in an embodiment selected, sampling points, where each texture sampling vector is in an embodiment the vector that would be used to sample the graphics texture (e.g. the "locally corrected" vector) for that (third) sampling point. Thus, in this embodiment, in effect a limited number of texture sampling vectors are determined, and then the (e.g. hardware) interpolation process is used to obtain the desired texture sampling vector (the vector to be used to sample the graphics texture) for the (and in an embodiment each) second sampling point in question. This can reduce the overall amount of processing required for determining the colour for the first sampling point in question, particularly where it is desired to determine a relatively large number of transparency parameters (for a relatively large number of second samplings points) for that first sampling point.

Each vector in the set of texture sampling vectors is in an embodiment determined by determining the position on the bounding volume intersected by a vector from the (third) sampling point in question to the light source, and then using the intersection position to determine the vector to be used to sample the graphics texture. In an embodiment, the vector from the third sampling point to the light source position (in world space) is determined, and the intersection point on the bounding volume of that vector from the third sampling point to the light source is then determined.

The vector from the third sampling position to the intersection point could simply be used as the texture sampling vector, but in an embodiment each vector in the set of texture sampling vectors is a "locally corrected" such vector. Thus, each texture sampling vector in the set of texture sampling vectors is in an embodiment the vector from the reference position that the texture is defined with respect to, to the intersection point on the bounding volume of the vector from the third sampling point to the light source (where the determined intersection point is in an embodiment used to determine this vector).

The third sampling points for which texture sampling vectors are determined for the set of texture sampling vectors can be selected as desired. For example, the number of third sampling points to be used can be selected as desired. As will be appreciated, using more third sampling points will result in more accurate results for the interpolation process, but at the expense of requiring more resources for determining the set of texture sampling vectors (and vice versa).

In one embodiment, the third sampling points comprise sampling points along (on) the sampling point to viewpoint (camera) vector. Thus, the third sampling points may comprise a subset of second sampling points. In another embodiment, the plural third sampling points may comprise sampling points along (on) the vectors from the vertices of the primitive that the first sampling point being considered relates to the viewpoint (camera) position.

The third sampling points are in an embodiment a relatively sparse (e.g. when compared to the set of second sampling points) selection of sampling points, and are in an embodiment spaced apart in a regular manner. The third sampling points are in an embodiment located at regularly intervals, and in an embodiment spread out, along the vector(s) in question, although it would also be possible to use irregular intervals. It would also be possible to use relatively more third sampling points in regions where it is known or expected that the light shaft will be present (and to use relatively fewer or no third sampling points in other regions).

In these embodiments, the vector to be used to sample the transparency representing graphics texture (for a given second sampling point) is in an embodiment determined by appropriate (e.g. hardware) interpolation using two or more texture sampling vectors from the set of texture sampling vectors.

Where the third sampling points comprise sampling points along (on) the first sampling point to viewpoint (camera) vector, the vector to be used to sample the transparency representing graphics texture for a given second sampling point should be (and in an embodiment is) determined by appropriate interpolation using the texture sampling vectors of the set of texture sampling vectors for third sampling points that lie on either side of (closest to) the second sampling point in question. Where the plural third sampling points comprise sampling points along (on) the vectors from the vertices of the primitive that the first sampling point being considered relates to the viewpoint (camera) position, a vertex interpolation should be (and in an embodiment is) also performed to determine the vector to be used to sample the transparency representing graphics texture for the second sampling point in question.

In these embodiments, it would be possible to reduce the number of first sampling points for which some or all of the processing of the technology described herein is performed (and in an embodiment this is done). That is, in an embodiment, the process of the technology described herein is performed for less than all first sampling points.

In an embodiment, for at least some, and in an embodiment each, texture sampling vectors of the set of texture sampling vectors, it is determined whether light from the light source falls on the corresponding third sampling point, e.g. by sampling the graphics texture using the texture sampling vector (as described below).

Where it is determined that light from the light source does not fall on all third sampling points of a particular first sampling point to viewpoint vector, then it may be assumed that light from the light source does not fall on any (second) sampling points on that vector.

Similarly, where it is determined that light from the light source does not fall on all third sampling points of the vertex to viewpoint vectors for a particular primitive, then it may be assumed that light from the light source does not fall on any (second) sampling points for that primitive. Thus, in this case it will not be necessary to perform any further processing in accordance with the technology described herein for the primitive in question.

Thus, in an embodiment, for at least some (in an embodiment each) texture sampling vectors of the set of texture sampling vectors, it is determined whether light from the light source falls on the corresponding third sampling point, and it is then determined whether further processing can be omitted on the basis of these determinations.

In effect, a "coarse" check as to whether ("third") sampling points are lit by the light source is initially performed (e.g. in the vertex shader), and then this coarse check is used to reduce (where appropriate) the processing required (e.g. in the fragment shader) for the subsequent "fine" determination of the colour(s) to be used to represent the first sampling point(s).

In these embodiments, it would also be possible to reduce the number of second sampling points on the first sampling point to viewpoint vector for which a transparency factor is determined (and accordingly for which a texture sampling vector is determined, the texture is sampled, etc.), and in an embodiment this is done. That is, in an embodiment, transparency parameters are determined for less than all of the second sampling points on the first sampling point to viewpoint vector.

In an embodiment, for at least some, and in an embodiment each, texture sampling vectors of the set of texture sampling vectors, it is determined whether light from the light source falls on the corresponding third sampling point, e.g. by sampling the graphics texture using the texture sampling vector (as described below). Where it is determined that light from the light source does not fall on adjacent third sampling points (or adjacent sets of third sampling points), then it may be assumed that light from the light source does not fall on any (second) sampling points between the adjacent third sampling points or sets of third sampling points. Thus, in this case it will not be necessary to determine transparency parameters for these second sampling points, and instead transparency parameters indicating that no light falls on the second sampling points in question (e.g. "1") can be used.

Thus, in an embodiment, for at least some (in an embodiment each) texture sampling vectors of the set of texture sampling vectors, it is determined whether light from the light source falls on the corresponding third sampling point, and it is then determined whether the transparency parameter determination process can be omitted for one or more second sampling points on the viewpoint to first sampling point vector on the basis of these determinations.

In effect, a "coarse" check as to whether ("third") sampling points are lit by the light source is initially performed (e.g. in the vertex shader), and then this coarse check is used to reduce the processing required (e.g. in the fragment shader) for the subsequent "fine" determination of whether ("second") sampling points are lit by the light source (i.e. for the step of determining the transparency parameter for the plural second sampling points).

These processes for determining a set of texture sampling vectors and determining the vector to be used to sample the transparency representing graphics texture by interpolation can be carried out by any desired and suitable stage or component of the graphics processing unit. In an embodiment the set of texture sampling vectors is determined by a vertex shading stage (a vertex shader) of the graphics processing unit, in an embodiment by executing an appropriate vertex shading program. Correspondingly, in an embodiment, the interpolation process(es) are performed by a fragment shading stage (a fragment shader) of the graphics processing unit, in an embodiment by executing an appropriate fragment shading program.

Other arrangements would also be possible, if desired.

Whether the vector to be used to sample the transparency representing graphics texture is determined using the intersection position, by interpolation or otherwise, the transparency-indicating texture should then be sampled appropriately, using the determined texture sampling vector, to retrieve the desired transparency value.

The transparency-indicating texture can be sampled in any desired and suitable manner. For example, appropriate filtering (interpolation) processes, such as bilinear filtering, can be used when sampling the texture, if desired. Similarly, in the case where the transparency-indicating texture is provided as a set of mipmaps, the sampling process is in an embodiment configured to filter (interpolate) the mipmaps to provide the sampled texture value, for example (and in an embodiment) using tri-linear filtering.

Where the texture is in the form of a set of mipmaps, the sampling process in an embodiment also comprises determining the mipmap level or levels (the level of detail) at which the transparency-indicating texture should be sampled (and then sampling the so-determined mipmap level(s) for the transparency-indicating texture).

The mipmap level (level of detail) to use is in an embodiment determined based on the distance from (the length of the vector from) the second sampling point being considered to the intersection position on the bounding volume of the vector from that sampling point to the light source.

Other arrangements would, of course, be possible.

These processes can again be carried out by any desired and suitable stage or component of the graphics processing unit. In an embodiment they are performed by a fragment shading stage (a fragment shader) of the graphics processing unit, in an embodiment by executing an appropriate fragment shading program. They may also or instead be performed at least in part by an appropriate texture mapping stage of the graphics processing unit, if desired.

The plural transparency parameter values for each of the plural second sampling points may be used to determine the colour to be used to represent the sampling point as seen from the viewpoint position for the scene in any suitable and desired manner.

In this regard, the Applicants have recognised that each of the determined transparency parameters will represent (e.g. will be proportional to) the amount of light that falls on the second sampling point in question from the light source, and therefore that each of the transparency parameters will be related to the amount of light that is scattered at the second sampling point in question and that will accordingly be visible from the viewpoint (camera) position for the scene. Furthermore, by determining plural such transparency parameters along the first sampling point to viewpoint vector, a "true" volumetric (realistic) representation of the effects of the light shaft as seen from the viewpoint (camera) position can be (and in an embodiment is) provided, e.g. regardless of the viewpoint (camera) and/or light source(s) position (in particular even if the viewpoint (camera) position is close to or inside of the light shaft).

Thus, according to an embodiment, for each second sampling point upon which the determined transparency parameter indicates that light from the light source falls (e.g. for each transparency parameter 1), a colour "contribution" (to the final colour for the first sampling point in question as seen from the viewpoint position) is determined.

Each of the colour contributions for the plural second sampling points is in an embodiment used in determining the colour to be used to represent the first sampling point in question (as seen from the viewpoint position), e.g. by combining (summing) the plural colour contributions, optionally together with one or more other colours for the first sampling point in question that may e.g. be determined in a (conventional) rendering calculation for the first sampling point. This can be done in any suitable and desired manner, e.g. by blending the determined colours together.

Each of the plural contributions may be used to (separately) affect the colour of the first sampling point in question, or the plural contributions may be combined (e.g. summed) in order to determine a "final" light shaft colour contribution for the first sampling position in question, which may then optionally be combined (blended) with the one or more other colours for the sampling point in question.

Each of the colour contributions may be determined in any suitable and desired manner, e.g. using any suitable and desired render equations.

According to one embodiment, for each second sampling point upon which the determined transparency parameter indicates that light from the light source falls, a constant colour contribution is provided and used. This represents a particularly simple and efficient technique for determining the effects of the light shaft on the first sampling point in question. The constant colour contribution can be selected as desired, and may depend e.g. on the properties (e.g., colour, intensity, position, etc.) of the light source.

According to another embodiment, each colour contribution may be arranged to be more directly dependent on the value of the transparency parameter. The colour contribution for each second sampling point may, for example, (directly) depend on (be proportional to) the value of the determined transparency parameter. For example, the determined transparency (alpha) parameter for each second sampling point could be used as or to derive a multiplying factor (and used e.g. to modify a colour for the light source).

Where the graphics texture also includes one or more colour channels (or where another colour texture is provided) (as described above), the texture sampling vector for the second sampling point could also be (and in one embodiment is) used to sample the graphics texture to determine a colour parameter for the light source. In this case, the determined colour parameter is in an embodiment used in determining the colour contribution for the second sampling point in question. This would then allow the effect of tinted (coloured) semi-transparent surfaces to be simulated and taken into account when calculating the effect of light shafts within the bounding volume.

It would also be possible to take into account the effects of different strengths of light-scattering, absorption, attenuation, etc. e.g. at different locations within the bounding volume (and in one embodiment this is done). This could be used, e.g., to simulate the effects of fog having a varying density within the bounding volume.

In an embodiment, a light-scattering, absorption or attenuation parameter indicative of the light-scattering, absorption or attenuation strength at at least some, in an embodiment each, second sampling point is determined, and the (e.g. constant or transparency parameter-dependent) determined colour contribution for each second sampling point is in an embodiment modified by the determined light-scattering parameter, e.g. by using the light-scattering, absorption or attenuation parameter as or to derive a multiplying factor. Each light-scattering, absorption or attenuation parameter may be determined, e.g. from a media "density" function defined for the bounding volume.

Additionally or alternatively, in an embodiment, the effects of non-uniformity in the light shaft may be simulated, e.g. using a noise texture (i.e. a texture comprising a random array of transparency (alpha) values). The noise texture may be sampled for transparent and/or semi-transparent regions of the transparency-indicating graphics texture, and the sampled value may e.g. be used to modify the determined colour contribution(s) for one or more second sampling points.

Thus, in an embodiment, a noise texture is sampled, and the sampled noise texture value is used in determining the colour to be used to represent the first sampling point as seen from the viewpoint position for the scene.

The noise texture may be integrated into (be part of) the transparency-indicating graphics texture or may be provided as a separate texture.

In one embodiment, the noise texture may be dynamic, i.e. may change with time (may be animated). This may be used e.g. to simulate the effects of moving objects (e.g. particles such as dust) within the bounding volume and/or moving objects (e.g. foliage, etc.) external to the bounding volume.

These processes for determining the colour to be used to represent the sampling point as seen from the viewpoint position for the scene can be carried out by any desired and suitable stage or component of the graphics processing unit. In an embodiment they are performed by the renderer of the graphics processing unit, and in an embodiment by a fragment shading stage of the graphics processing unit (again in an embodiment by executing an appropriate fragment shading program that performs the desired rendering calculations).

As described above, in an embodiment, the light shaft colour contribution(s) for a given first (screen space) sampling point can be (and in an embodiment are) combined (blended) with one or more colours determined for that first sampling point by other (e.g. conventional) rendering processes to determine the (final) colour to represent that first sampling point.

It would also be possible to use the light shaft colour contribution(s) for a given first (screen space) sampling point in respect of one or more other first (screen space) sampling points (e.g. fragments), e.g. by combining the light shaft colour contribution(s) with one or more colours determined for the other first sampling point (e.g. fragment) (by other (e.g. conventional) rendering processes) to determine the (final) colour to represent the other first sampling point (e.g. fragment).

In an embodiment, the light shaft colour contributions (determined from the transparency parameters) are determined (evaluated) at a relatively low resolution (e.g. when compared to the (e.g. conventional) rendering processes performed for the array of first sampling points (e.g. fragments)). The so-determined light shaft colour contributions and in an embodiment then scaled up and in an embodiment blurred (e.g. using appropriate hardware), and in an embodiment combined (blended) with the results of the other (e.g. conventional) rendering processes performed for the scene. This can further reduce the amount of resources required for determining the effects of the light shaft.

Thus, in an embodiment, the determined transparency parameter values for each of the plural second sampling points are used to determine a colour contribution to the colour to be used to represent the first sampling point as seen from the viewpoint position for the scene, plural such colour contributions are determined for the scene, and plural colours to be respectively used to represent each of plural first sampling points on or within the bounding volume as seen from the viewpoint position for the scene are determined for the scene, wherein the colour contributions are determined at a lower resolution than are the colours to be used to represent each of the plural first sampling points.

Any or all of the above processes could be performed for sampling points individually, or some or all of them could be performed for sets of plural sampling points (which would then have the effect of performing the process for the sampling points within the set that is being considered). For example, where the graphics processing unit operates on fragments that each represent a set of plural sampling positions, the process of the technology described herein could be performed on a per-fragment basis, rather than individually for each sampling point that a fragment represents (and in an embodiment this is what is done). In this case, there would accordingly be, e.g., a single colour determined for a fragment, which would then be used for each sampling point that the fragment is being used to render.

As will be appreciated from the above, an advantage of the technology described herein is that the technique can be used to calculate light shafts irrespective of the position of the light source that is external to the bounding volume. Furthermore, this means that the same graphics texture representing the transparency of the surface of the bounding volume can be used for different external light sources.

Thus the technology described herein can be extended to an arbitrary number of lights that are external to the bounding volume. In this case, the process of the technology described herein to determine a colour contribution for a sampling point for a light source should be, and in an embodiment is, repeated for each external light source that could give rise to a light shaft in the bounding volume. A separate light source contribution is in an embodiment determined for each light source being considered, with the separate light source contribution values then being combined appropriately to determine the overall effect of the light sources at the sampling point in question.

Thus, in an embodiment, the process of the technology described herein is repeated for each of plural light sources external to the bounding volume (and in an embodiment for all of the light sources external to the bounding volume), for example to determine the effects of light shafts due to two or more external light sources for sampling points within or on the bounding volume. Where plural external light sources are being considered, in an embodiment the operation in the manner of the technology described herein is performed for each light source separately, such that a colour contribution is determined for each light source separately, with the resulting values for the respective separate light sources then being combined appropriately to determine the overall effect of the plural light sources for the sampling point.

It will also be appreciated that although the technology described herein has been described above with particular reference to determining a colour at a given first sampling point on or within the bounding volume in question, the technique of the technology described herein can be, and in an embodiment is, used for plural first sampling points on and within the bounding volume, and in an embodiment for each first sampling point on or within the bounding volume that needs to be considered when rendering the scene.

Thus, the process is in an embodiment repeated for each sampling point for a primitive that is on or within the bounding volume that is being considered, and for each primitive that is on or within the bounding volume that is being considered.

Similarly, the process is in an embodiment repeated for plural scenes in a sequence of scenes being rendered, e.g., and in an embodiment, for each frame of a sequence of frames to be rendered, that includes an external light source or sources that could give rise to light shafts.

It will be appreciated from the above that the technique of the technology described herein is particularly applicable to situations where it is desired to determine and simulate the effect of light shafts from a light source that is external to a bounding volume that represents all or part of a scene to be rendered. Thus the technology described herein is particularly suitable for, and in an embodiment is used for, determining and simulating the effect of light shafts for environments within a scene, such as rooms, but is less useful for (and is in an embodiment not used for) determining light shafts due to lights that are within the bounding volume being considered.

Where there are other light sources that the technique of the technology described herein cannot or is preferred not to be used for, then other, e.g. known, light shaft simulation techniques can be used for those light sources. Thus, in an embodiment, the technique of the technology described herein can be, and is in an embodiment, used in combination with one or more other techniques for determining and simulating the effect of light shafts. Thus, for example, in the case of a scene that has a light source that is external to the scene bounding volume and a light source that is inside the scene bounding volume, the technique of the technology described herein is in an embodiment used to determine and simulate the effect of light shafts due to the external light source, but a different light shaft determination and simulation technique is in an embodiment used for the light source that is inside the bounding volume. This arrangement can then be repeated for each and every light source that affects the scene.

The technique of the technology described herein can also be combined with any one or more other rendering techniques, as desired. For example, the technique of the technology described herein may be combined with techniques for taking account of the effect of shadows and/or reflections, etc.

In an embodiment, where it is desired to render both light shafts and shadows and/or reflections in a scene, then the same graphics texture (e.g. cubemap) that is used to take account of the effect of lights shafts (as described above) is also used to take account of the effect of shadows (to perform shadow mapping) and/or reflections (to perform reflection mapping). This represents a particularly convenient and efficient technique for rendering complex and high quality scenes.

In an embodiment, in order to (additionally) take account of the effects of shadows when rendering the scene, for at least one first sampling point on or within the bounding volume, a transparency parameter indicative of the amount of shadow cast on the sampling point by the light source is determined by: determining the position on the bounding volume intersected by a vector from the sampling point to the light source; using the intersection position to determine a vector to be used to sample the graphics texture that represents the transparency of the surface of the bounding volume in the scene; and using the determined vector to sample the graphics texture to determine a transparency parameter value for the light source for the sampling point. As will be appreciated by those having skill in the art, since in this embodiment the same graphics texture (cubemap) is used for determining both the effects of shadows and light shafts, the rendered shadow(s) and light shaft(s) will appropriately match in the scene.

The technology described herein can be used in and with any suitable and desired graphics processing system and unit. The graphics processing unit in an embodiment comprises a graphic processing pipeline.

The technology described herein is particularly suitable for use with tiled renderers (tile-based graphics processing systems). Thus, in an embodiment, the graphics processing unit is a tiled-based graphics processing unit.

The graphic processing unit in an embodiment comprise a plurality of processing stages, including at least a rasteriser that rasterises input primitives to generate graphics fragments to be processed, each graphics fragment having one or more first sampling positions associated with it, and a renderer that processes fragments generated by the rasteriser to generate output fragment data.

The rasteriser of the graphics processing unit will in an embodiment generate graphics fragments to be rendered to generate rendered graphics data for sampling points of the desired graphics output, such as a frame to be displayed. Each graphics fragment that is generated by the rasteriser has associated with it a set of ("first") sampling points of the graphics output and is to be used to generate rendered graphics data for one or more of the sampling points of the set of sampling points associated with the fragment.

The rasteriser may be configured to generate the fragments for rendering in any desired and suitable manner. It will in an embodiment receive e.g. primitives to be rasterised, test those primitives against sets of ("first") sampling point positions, and generate fragments representing the primitives accordingly.

The renderer should process the fragments generated by the rasteriser to generate rendered fragment data for (covered) ("first") sampling points that the fragments represent. These rendering processes may include, for example, fragment shading, blending, texture-mapping, etc. In an embodiment the renderer is in the form of or includes a programmable fragment shader.

The graphics processing unit may also contain any other suitable and desired processing stages that a graphics processing unit may contain such as an early depth (or an early depth and stencil) tester, a late depth (or depth and stencil) tester, a blender, a tile buffer or buffers, a write-out unit, etc.

The graphics processing unit in an embodiment also comprises, and/or is in communication with, one or more memories and/or memory devices that store the data described herein, such as the transparency-indicating textures, scene bounding volumes, etc., and/or that store software for performing the processes described herein. The graphics processing unit may also be in communication with the host microprocessor, and/or with a display for displaying images based on the data generated by the graphics processing unit.

The graphics processing unit in an embodiment includes at least local memory, such as (on-chip) buffer or buffers, and/or register(s), that can be used to store the data required for the transparency parameter determination process and the determined transparency parameters. Where present, the tile buffers can be used for this purpose, if desired. The graphics processing unit can in an embodiment also cache sampled transparency values for future use, if desired.

The technology described herein can be used for all forms of output that a graphics processing unit may be used to generate, such as frames for display, render-to-texture outputs, etc.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or micro-processor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Furthermore, any one or more or all of the processing stages of the technology described herein may be embodied as processing stage circuitry, e.g., in the form of one or more fixed-function units (hardware) (processing circuitry), and/or in the form of programmable processing circuitry that can be programmed to perform the desired operation. Equally, any one or more of the processing stages and processing stage circuitry of the technology described herein may comprise a separate circuit element to any one or more of the other processing stages or processing stage circuitry, and/or any one or more or all of the processing stages and processing stage circuitry may be at least partially formed of shared processing circuitry.

Subject to any hardware necessary to carry out the specific functions discussed above, the graphics processing system can otherwise include any one or more or all of the usual functional units, etc., that graphics processing systems include.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

Embodiments of the technology described herein will now be described in the context of the processing of computer graphics for display.

When a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

FIG. 1 shows schematically a graphics processing pipeline 1 that may operate in accordance with the technology described herein. The graphics processing pipeline 1 is a tiled deferred renderer with a fully programmable GPGPU context, for example a renderer which executes partly via Direct Compute, OpenCL, CUDA, etc.

As the graphics processing pipeline 1 shown in FIG. 1 is a tile-based renderer, it will thus produce tiles of a render output data array, such as an output frame to be generated.

(In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential. Each tile corresponds to a respective set of screen space ("first") sampling positions.)

The render output data array may typically be an output frame intended for display on a display device, such as a screen or printer, but may also, for example, comprise intermediate data intended for use in later rendering passes (also known as a "render to texture" output), etc.

FIG. 1 shows the main elements and pipeline stages of the graphics processing pipeline 1 that are relevant to the operation of the present embodiment. As will be appreciated by those skilled in the art there may be other elements of the graphics processing pipeline that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processing pipeline as shown in FIG. 1 may be implemented as desired and will accordingly comprise, e.g., appropriate circuitry and/or processing logic, etc., for performing the necessary operation and functions.

FIG. 1 shows schematically the pipeline stages after the graphics primitives (polygons) 2 for input to the rasterisation process have been generated. Thus, at this point the graphics data (the vertex data) has undergone fragment frontend operations 8, such as transformation operations (not shown), vertex shading, interpolation and a primitive set-up stage (not shown) to set-up the primitives to be rendered, in response to the commands and vertex data provided to the graphics processor.

As shown in FIG. 1, this part of the graphics processing pipeline 1 includes a number of stages, including a rasterisation stage 3, an early Z (depth) and stencil test stage 4, a renderer in the form of a fragment shading stage 6, a late Z (depth) and stencil test stage 7, a blending stage 9, a tile buffer 10 and a downsampling and writeout (multisample resolve) stage 13.

The rasterisation stage 3 of the graphics processing pipeline 1 operates to rasterise the primitives making up the render output (e.g. the image to be displayed) into individual graphics fragments for processing. To do this, the rasteriser 3 receives graphics primitives 2 for rendering, rasterises the primitives to ("first") sampling points and generates graphics fragments having appropriate positions (representing appropriate sampling positions) for rendering the primitives.

The fragments generated by the rasteriser are then sent onwards to the rest of the pipeline for processing.

The early Z/stencil stage 4 performs a Z (depth) test on fragments it receives from the rasteriser 3, to see if any fragments can be discarded (culled) at this stage. To do this, it compares the depth values of (associated with) fragments issuing from the rasteriser 3 with the depth values of fragments that have already been rendered (these depth values are stored in a depth (Z) buffer that is part of the tile buffer 10) to determine whether the new fragments will be occluded by fragments that have already been rendered (or not). At the same time, an early stencil test is carried out.

Fragments that pass the fragment early Z and stencil test stage 4 are then sent to the fragment shading stage 6. The fragment shading stage 6 performs the appropriate fragment processing operations on the fragments that pass the early Z and stencil tests, so as to process the fragments to generate the appropriate rendered fragment data.

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 10 to determine whether the fragment data for the new fragments should replace the fragment data of the fragments that have already been rendered, by comparing the depth values of (associated with) fragments issuing from the fragment shading stage 6 with the depth values of fragments that have already been rendered (as stored in the depth buffer). This late fragment depth and stencil test stage 7 also carries out any necessary "late" alpha and/or stencil tests on the fragments.

The fragments that pass the late fragment test stage 7 are then subjected to, if required, any necessary blending operations with fragments already stored in the tile buffer 10 in the blender 9. Any other remaining operations necessary on the fragments, such as dither, etc. (not shown) are also carried out at this stage.

Finally, the (blended) output fragment data (values) are written to the tile buffer 10 from where they can, for example, be output to a frame buffer for display. The depth value for an output fragment is also written appropriately to a Z-buffer within the tile buffer 10. (The tile buffer will store colour and depth buffers that store appropriate colour, etc., values or a Z-value, respectively, for each sampling position that the buffers represent (in essence for each sampling position of a tile that is being processed).) These buffers store an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 10 is input to a downsampling (multisample resolve) write out unit 13, and thence output (written back) to an external memory output buffer, such as a frame buffer of a display device (not shown). (The display device could comprise, e.g., a display comprising an array of pixels, such as a computer monitor or a printer.)

In the present embodiments, the downsampling and writeout unit 13 downsamples (in either a fixed or variable fashion) the fragment data stored in the tile buffer 10 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 1 would, of course, be possible.

The above describes certain features of the operation of the graphics processing system shown in FIG. 1. Further features of the operation of the graphics processing system shown in FIG. 1 that allow the effect of light shafts in an image being rendered to be simulated in accordance with embodiments of the technology described herein will now be described.

The present embodiments operate to simulate the effect of light shafts within a defined volume for a scene due to light sources that are external to that bounding volume.

Figure 2:
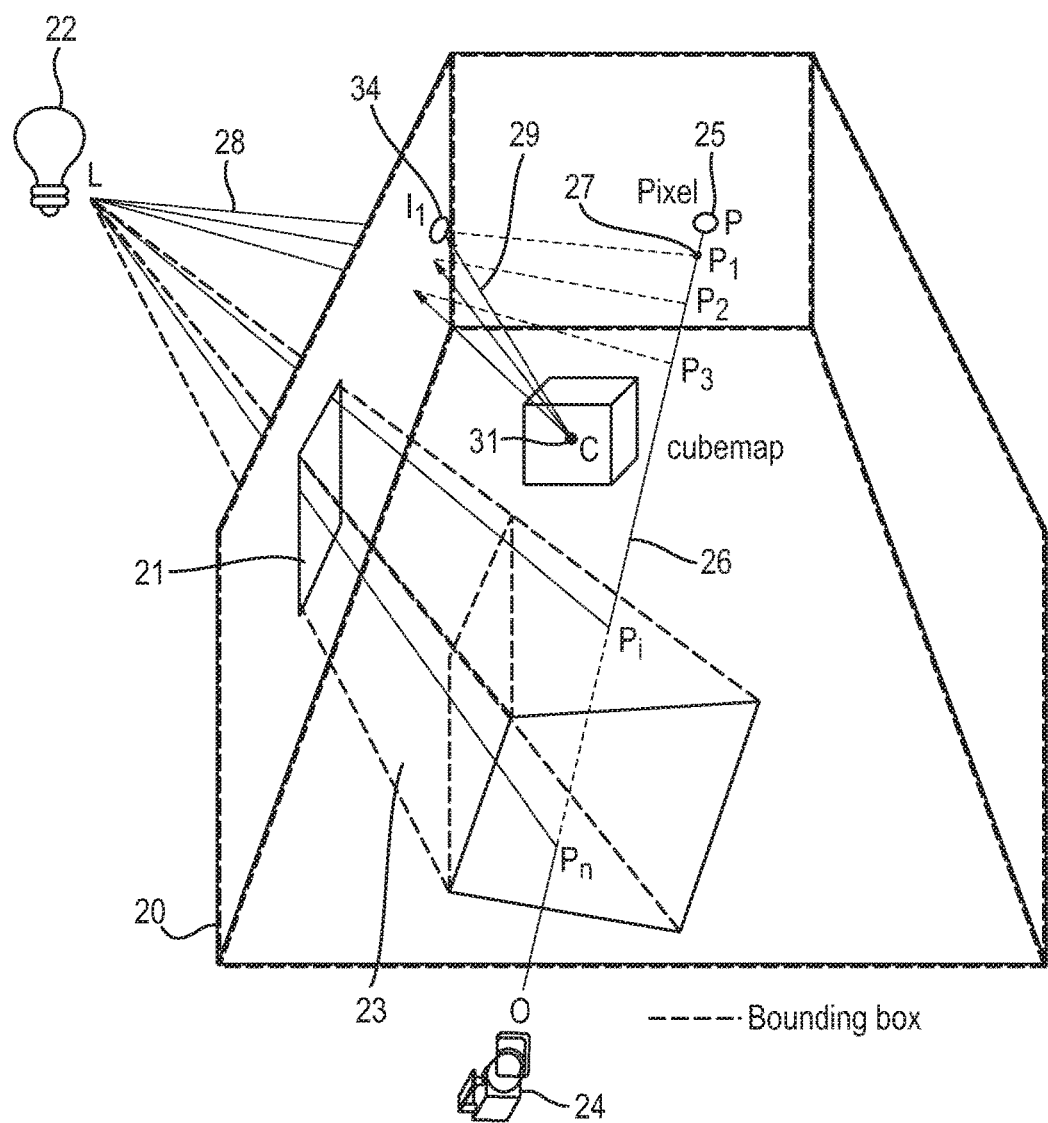
FIG. 2 shows schematically the operation of an embodiment of the technology described herein.

FIG. 2 illustrates this and shows an exemplary bounding volume 20 in the form of a bounding box that is defined in world space, that represents a volume within the scene being rendered. In the present embodiment it is assumed that the bounding volume 20 corresponds to the entire scene and represents e.g., a room, but other arrangements would, of course, be possible. As can be seen in FIG. 2, the bounding volume 20 is assumed to have a window 21, but otherwise opaque walls.

It is also assumed, as shown in FIG. 2, that there is a light source 22 external to the bounding volume 20 that will shine through the window 21 and accordingly give rise to a light shaft 23 within the bounding volume 20. As discussed above, the technology described herein relates to arrangements for determining the effect of the light shaft 23 on the scene as seen from the viewpoint (camera) position 24 for the scene.

To facilitate the operation in the manner of the technology described herein, in the present embodiment a cube texture corresponding to the surface of the bounding volume 20 that stores transparency (alpha) values representing the transparency of the surface of the bounding volume 20 is generated.

Figure 3:
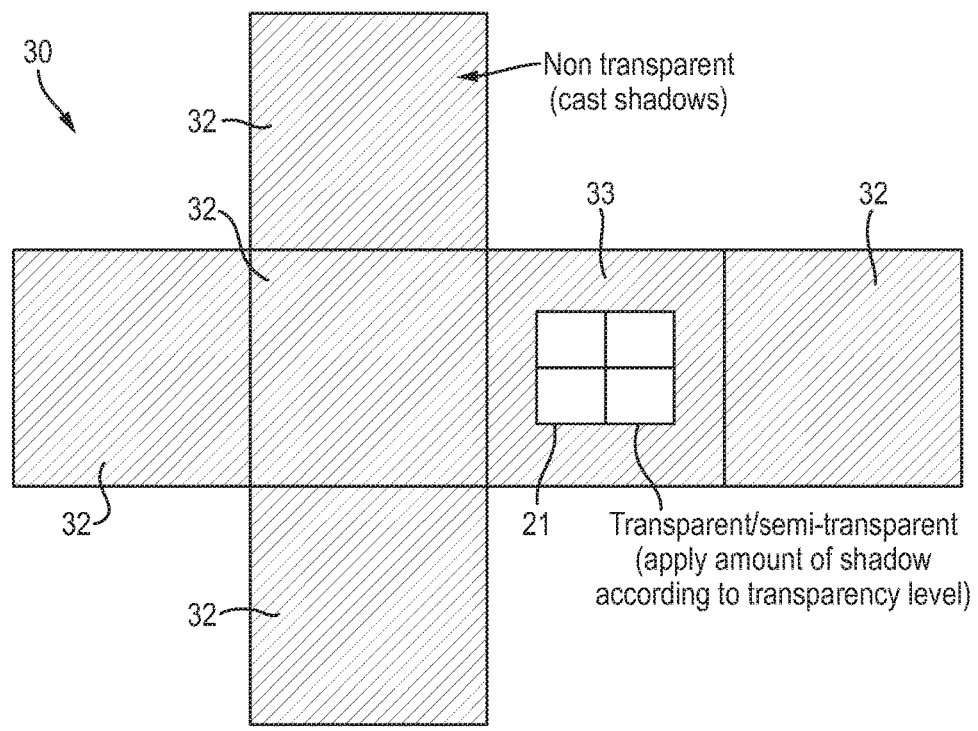
FIG. 3 shows an exemplary texture used in an embodiment of the technology described herein.

FIG. 3 shows the corresponding cube texture 30 for the bounding volume 20 shown in FIG. 2. As shown in FIG. 3, the cube texture 30 will store values indicating non-transparent surfaces for those regions of the bounding volume surface that are opaque, but for the region of the bounding volume surface where the window 21 is present, transparency values indicating transparency (or at least semi-transparency) will be stored. Thus the faces 32 of the cube texture 30 that are opaque will store alpha values of 1, as will the region 33 surrounding the window 21, but the region of the window 21 will store alpha values less than 1 to indicate that that part of the surface of the bounding volume is semi-transparent or completely transparent.

Figure 4:
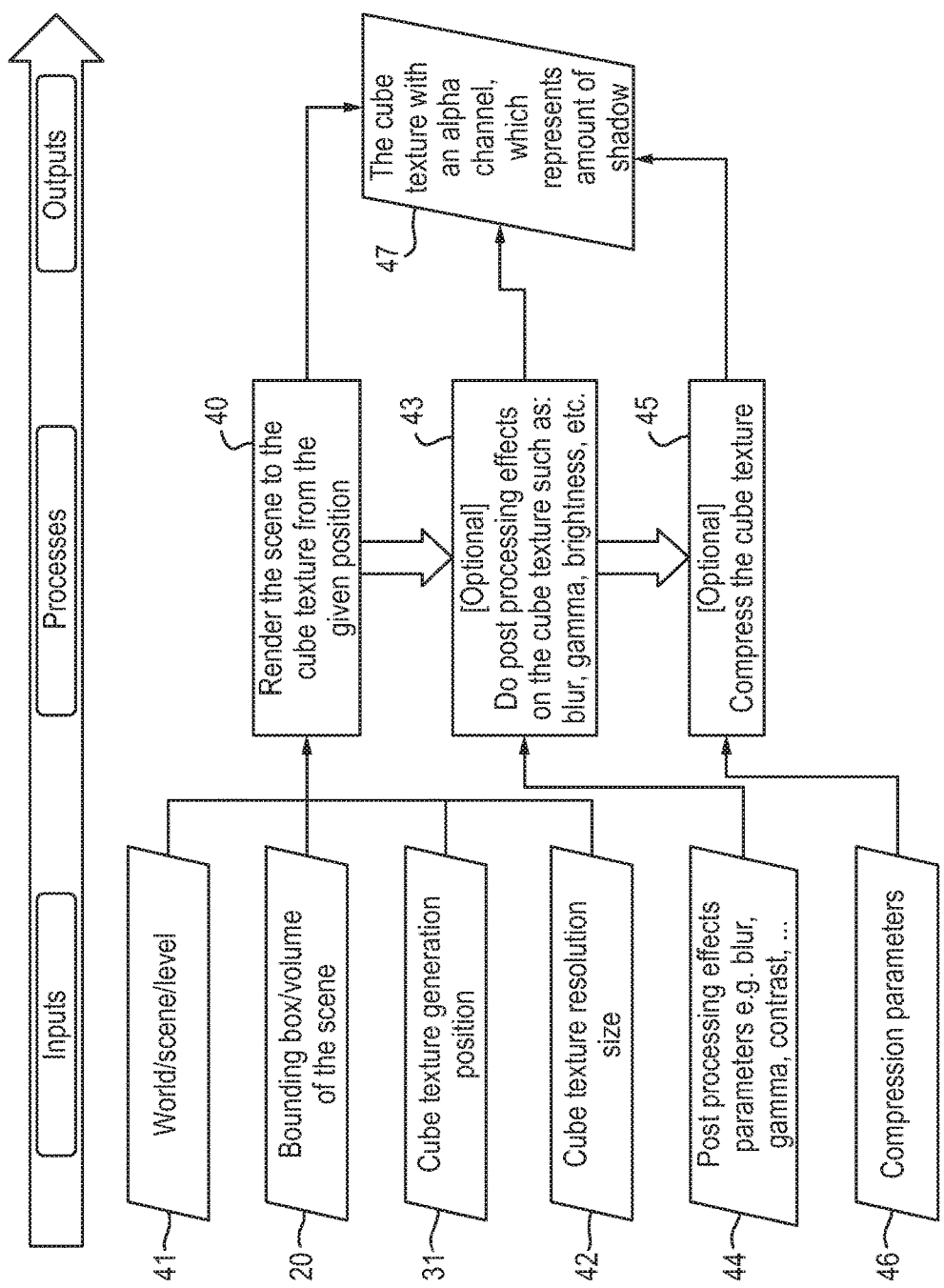
FIG. 4 shows schematically the generation of a texture in an embodiment of the technology described herein.

FIG. 4 shows schematically the generation of the cube texture shown in FIG. 3. As shown in FIG. 4, the process starts by rendering the scene (or at least the alpha values of the scene) to the cube texture from the reference position 31 (shown in FIG. 2) that the cube texture is to be defined with respect to (step 40). (The cube texture 30 will be defined with respect to a reference position 31 (shown in FIG. 2) within the volume that the cube texture represents (thus the bounding volume for the scene), and will be sampled by determining the direction from that reference position that the sampled value (the sampled position) is required for.)

This process uses as its inputs information about the scene 41, information defining the bounding volume 20, information defining the reference position 31 for the cube texture, and information indicating the resolution size 42 that is desired for the cube texture.

The cube texture 30 is generated by rendering an image that will represent the surface of the bounding volume 20 from the viewpoint of the reference position 31 for the texture. To do this respective positions on the surface (the image representing the surface) for the scene (as defined by the scene information 41) are sampled for respective positions on the bounding volume (in the relevant direction from the reference position 31 for the texture). In this process, as the bounding volume will typically be an approximation of the actual scene and so may not match exactly to the surface of the scene (e.g. room) being defined, the points of the surface that are sampled for the texture (for each texel) do not need to fall exactly on the walls of the bounding volume 20 but can be on, outside of or inside the bounding volume. The output 47 of this cube texture generation process is then the cube texture as shown in FIG. 3, having an alpha (transparency) channel which represents the transparency of the surface of the bounding volume for the scene that the cube texture relates to at respective positions on the surface of the bounding volume.

As shown in FIG. 4, once the cube texture has been generated, it may optionally be subjected to various processing effects and optimisations, such as blurring, gamma correction, brightness and/or contrast enhancement, etc. (step 43). This step uses as inputs desired post-processing effect parameters, such as blurring parameters, gamma correction parameters, contrast parameters, etc.

This optimisation processing is possible because the cube texture 30 can be re-used whenever the scene in question is required, and for all external light sources, and does not need to be regenerated dynamically in use, and so non-real-time optimisations that would not be suitable for real-time generation of the cube texture can be used.

Furthermore, as shown in FIG. 4, the generated (and if desired post-processed) cube texture can be compressed (step 45), using desired compression parameters 46. Again this is possible because the cube texture does not need to be generated in real-time. Any suitable texture compression scheme can be used to compress the cube texture.

The cube texture generation and any post-processing/compression of the cube texture can be performed as desired and using any suitable processing system. In an embodiment the cube texture is generated "offline" and stored, and then provided to the graphics processing pipeline for use when it is required. It should also be noted here that no definition of the light or lights is required or used for the cube texture generation.

The use of the cube texture shown in FIG. 3 to determine the effect of light shafts due to the light 22 within the bounding volume 20 will now be described with reference to FIGS. 2, 5, 6, 7 and 8.

FIGS. 5-8 show schematically the main steps of the process.

The present embodiment operates to determine for respective ("first") screen space sampling points 25 on or within the bounding volume 20 that are being rendered, the effect, if any, of the light shaft 23 (due to scattering of light from the light source 22) on the colour of the sampling point 25 as seen from the viewpoint (camera) position 24 using the cube texture 30. Essentially, as each primitive for the scene that is on or within the bounding volume 20 is rendered, for each sampling point 25 of the primitive, the process shown schematically in FIG. 5 is performed to determine the effect of the light shaft 23 on the colour of the sampling point 25 in question (i.e. to determine, in effect, a light shaft colour contribution to apply to the sampling point 25 in question).

Figure 5:
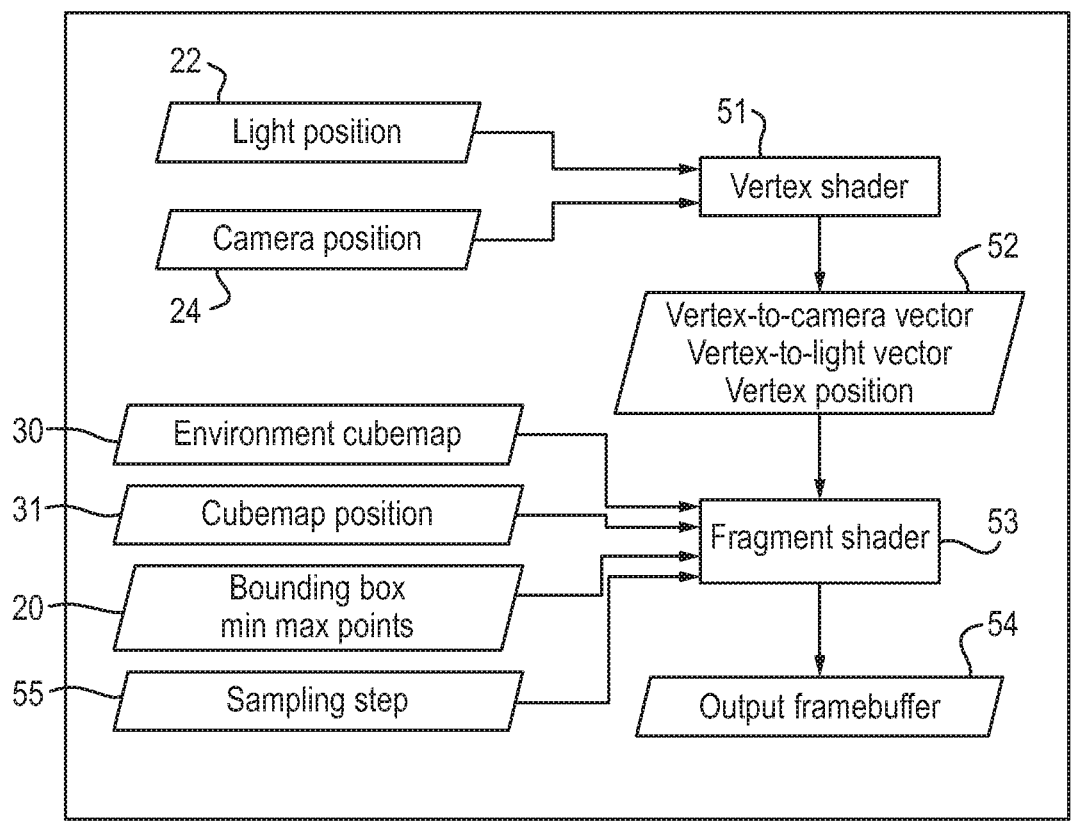
FIGS. 5, 6, 7 and 8 illustrate the operation of an embodiment of the technology described herein.

Thus, FIG. 5 shows the process for a given screen space sampling point 25. This process is repeated for each ("first") screen space sampling point 25 that is to be processed in the manner of the present embodiment.

As shown in FIG. 5, the process of the present embodiment starts in the vertex shading stage of the fragment frontend operations 8 of the graphics processing pipeline (step 51).

Figure 6:
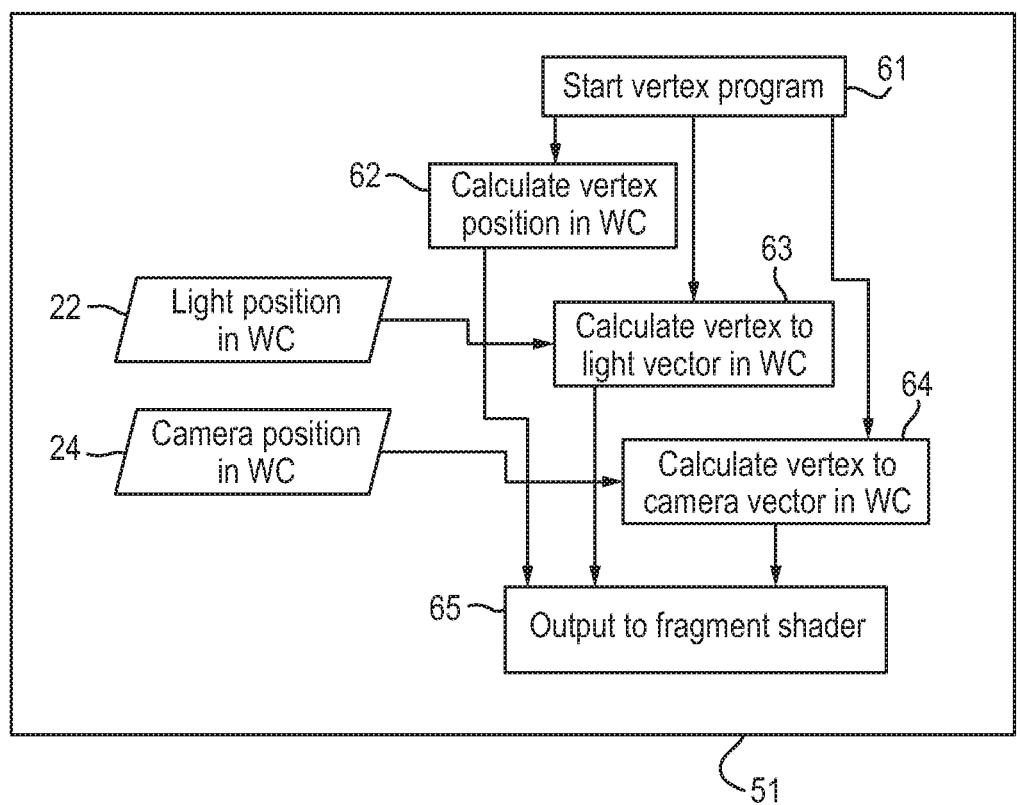

As shown in FIG. 6, the vertex shading program is started (step 61). The vertex positions in world space of the primitive that the screen space sampling point 25 being considered relates to are determined (step 62), the vectors from these vertices to the light source 22 are determined (step 63) using the position of the light source 22 in world space as an input, and the vectors from the vertices to the viewpoint (camera) position 24 are determined (step 64) using as an input the viewpoint (camera) position 24 in world space. These values are then output to the fragment shader (step 65).

Accordingly, as shown in FIG. 5, the result of the vertex shading stage 51 is the vertex positions, the vectors from the vertices to the light source 22, and the vectors from the vertices to the viewpoint (camera) position 24 (step 52). The process is continued in the fragment shader (step 53).

Figure 7:
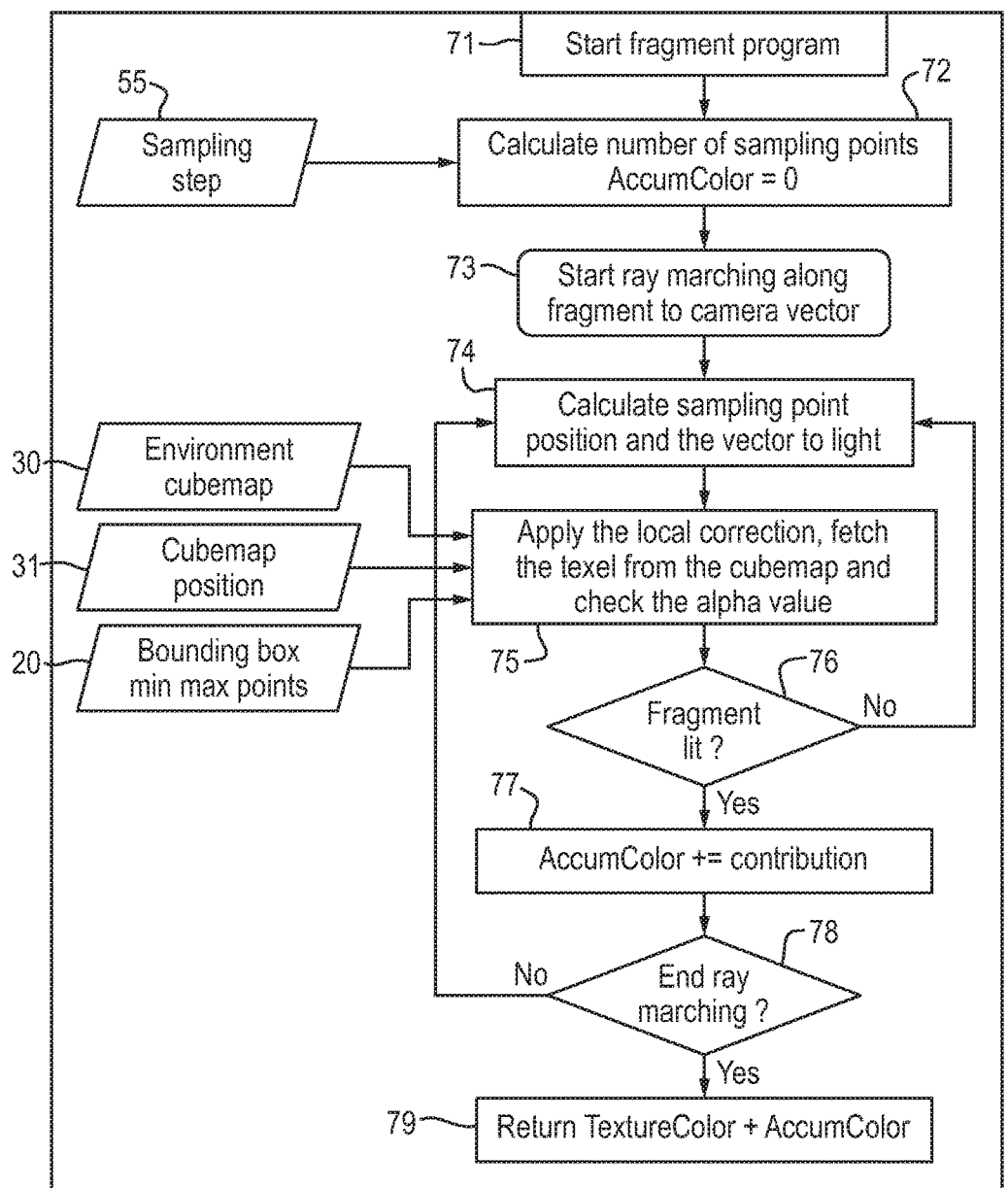

As shown in FIG. 7, after starting the fragment shader program (step 71), the number n of required ("second") intermediate sampling points ($P_1, P_2, \ldots P_n$) on a vector 26 from the screen space sampling point 25 in question to the viewpoint (camera) position 24 are firstly determined using as an input a sampling step 55 which may be set as desired. A colour contribution ("AccumColor") parameter is also initialised to zero (step 72).

A "ray marching" process along the sampling point (fragment) to viewpoint (camera) vector 26 is then started (step 73). Essentially, in this process, for each intermediate ("second") sampling point 27 of the set of intermediate sampling points ($P_1, P_2, \ldots P_n$) on the screen space sampling point to viewpoint vector 26, a colour contribution to the final colour for the screen space ("first") sampling point 25 in question as seen from the viewpoint position 24 is determined. Each colour contribution represents the amount of light from the light source 22 that reaches the viewpoint (camera) 24 due to light scattering at the intermediate sampling point 27. In this way, a "true" volumetric representation of the light shaft 23 as seen from the viewpoint 24 can be provided.

Thus, as shown in FIG. 7, for each ("second") intermediate sampling point 27 on the sampling point to viewpoint (camera) vector 26, the position of that sampling point is determined together with the vector 28 from the intermediate sampling point 27 to the light source 22 (step 74). Next, a vector 29 to be used to sample the cube texture 30 is determined, and the cube texture 30 is sampled using that vector to determine an alpha value for the intermediate sampling point 27 in question (step 75). This process is shown in FIG. 8.

Figure 8:
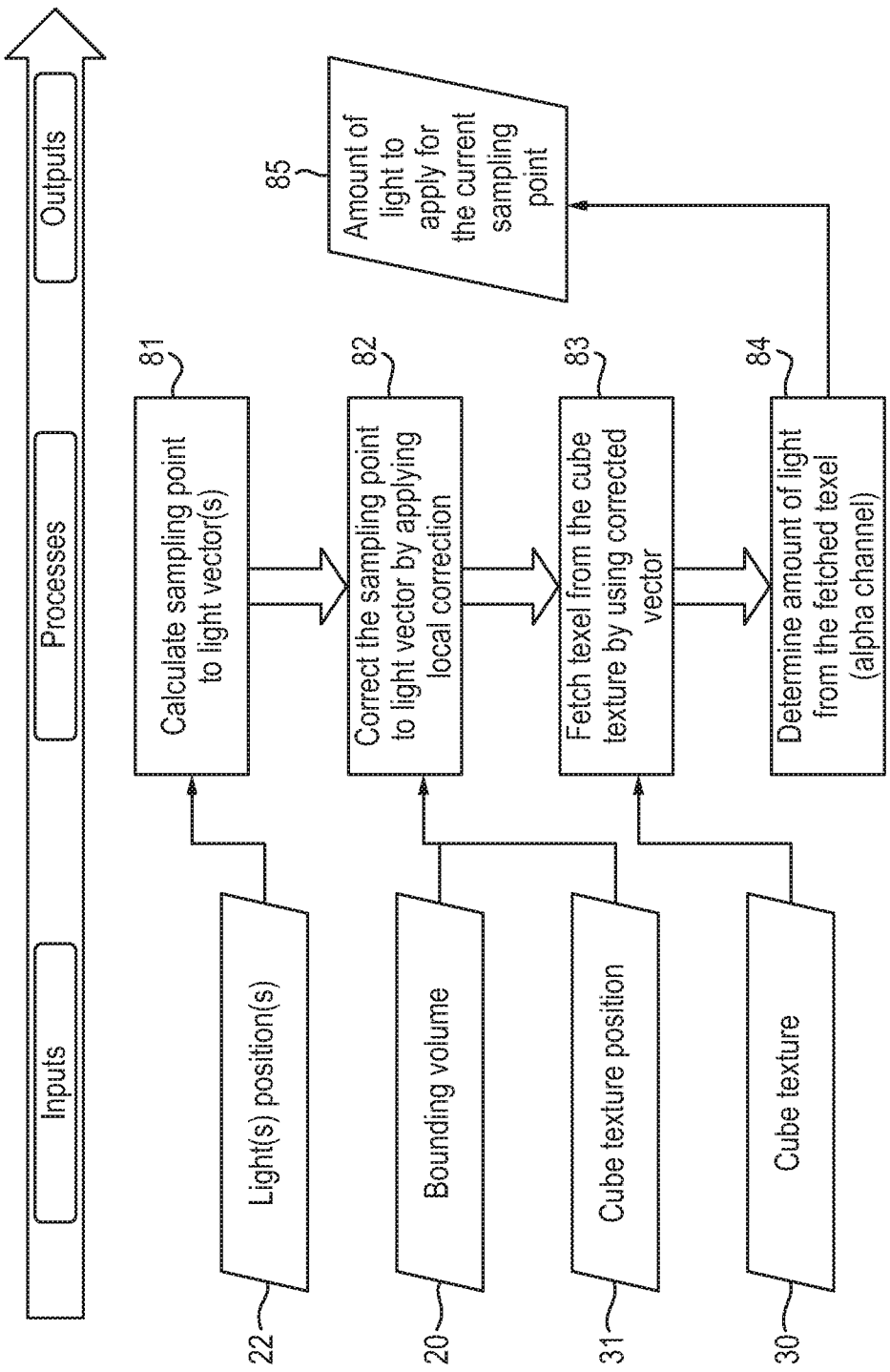

As shown in FIG. 8, the process starts by determining the vector 28 from the intermediate sampling point 27 that is being considered to the light source 22 (step 81). This process uses as its input the position of the light 22 and the position of the sampling point 27.

The next step is to apply a "local correction" to the sampling point to light vector 28 to ensure that the correct position within the cube texture 30 is sampled (step 82). This is required, because, as can be seen from FIG. 2, for example, the reference position 31 that the cube texture is sampled from (with respect to) may not (and typically will not) correspond to the sampling position 27 being considered, such that simply taking the vector 28 from the sampling point 27 to the light source 22 and using that to sample from the reference position 31 for the cube texture 30 will not sample the correct part of the cube texture.

To apply this "local correction", as shown in FIG. 2, the intersection point 34 on the surface of the bounding volume 20 of the vector 28 from the sampling point 27 to the light 22 is determined, and then the vector 29 from the reference position 31 that the cube texture 30 is defined with respect to the intersection point 34 on the bounding volume 20 is determined, and that vector 29 is then used to sample the cube texture 30 (step 83). This will, accordingly, and as can be seen from FIG. 2, sample the cube texture 30 at the intersection position 34 that corresponds to the portion of the surface of the bounding volume 20 that lies between the sampling point 27 being processed and the light source 22.

The cube texture 30 is then sampled at the position corresponding to the intersection position 34 to determine the alpha value (i.e. the transparency) of the surface of the bounding volume 20 at that point (step 84). The cube texture 30 can be sampled using any desired texture sampling (filtering) process, such as bilinear and/or tri-linear filtering (e.g. in the case where the cube texture 30 is in the form of mipmaps). The filtering may, e.g., be provided by a texturing module (stage) of the graphics processing pipeline. This then gives an alpha value (a transparency value) 85 that is indicative of the amount of light that falls on the sampling point 27 from the light source 22.

Returning now to FIG. 7, the output alpha value 85 is then used to determine whether or not the intermediate sampling point 27 in question is lit by the light source 22 (step 76). This will be the case where the alpha value is not equal to "1". Where the sampling point 27 is lit, then some colour contribution is added to the colour contribution parameter (step 77), and the next intermediate sampling point in the set of sampling points ($P_1, P_2, \ldots P_n$) along the sampling point to viewpoint (camera) vector 26 is then considered. Where the sampling point 27 is not lit (i.e. where the sampled alpha value is equal to "1"), no contribution is added to the colour contribution parameter, and then the next intermediate sampling point in the set of sampling points ($P_1, P_2, \ldots P_n$) along the sampling point to viewpoint (camera) vector 26 is considered. Once all of the intermediate sampling points in the set of intermediate sampling points ($P_1, P_2, \ldots P_n$) have been considered, the ray marching process is ended (step 78).

The final value of the colour contribution parameter can then be used as desired (and as required), e.g. together with the results of one or more appropriate rendering calculations (e.g. using another texture), to determine the final colour for the screen space sampling point 25 as seen from the camera position 24 (step 79).

As shown in FIG. 5, the final colour value is then output to the frame buffer (tile buffer 10) (step 54).

The above processes are repeated for all of the screen space ("first") sampling points, and for all the primitives that are to be rendered (and then for the next frame (if appropriate), and so on).

Figure 9:
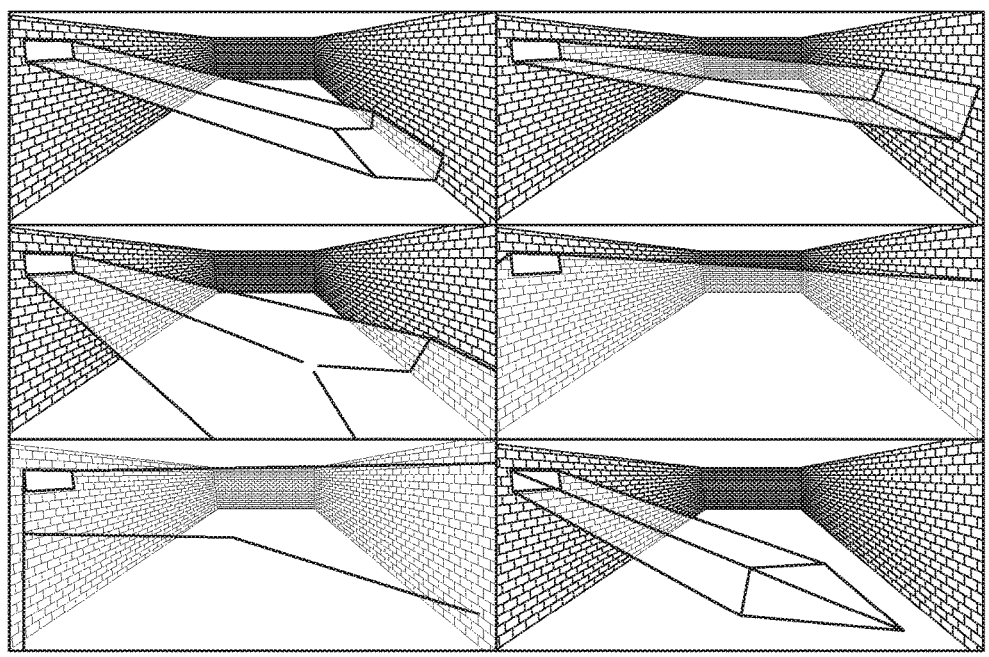
FIG. 9 shows a light shaft rendered from a number of different positions in accordance with an embodiment of the technology described herein.

FIG. 9 shows various light shafts rendered using the technique of the technology described herein, i.e. with a single cube texture 30. Each image shows the results of the rendering process, where the light source 22 is in a different position. As can be seen from FIG. 9, when the position of light source 22 changes, the rendered light shaft changes accordingly.

Figure 10:
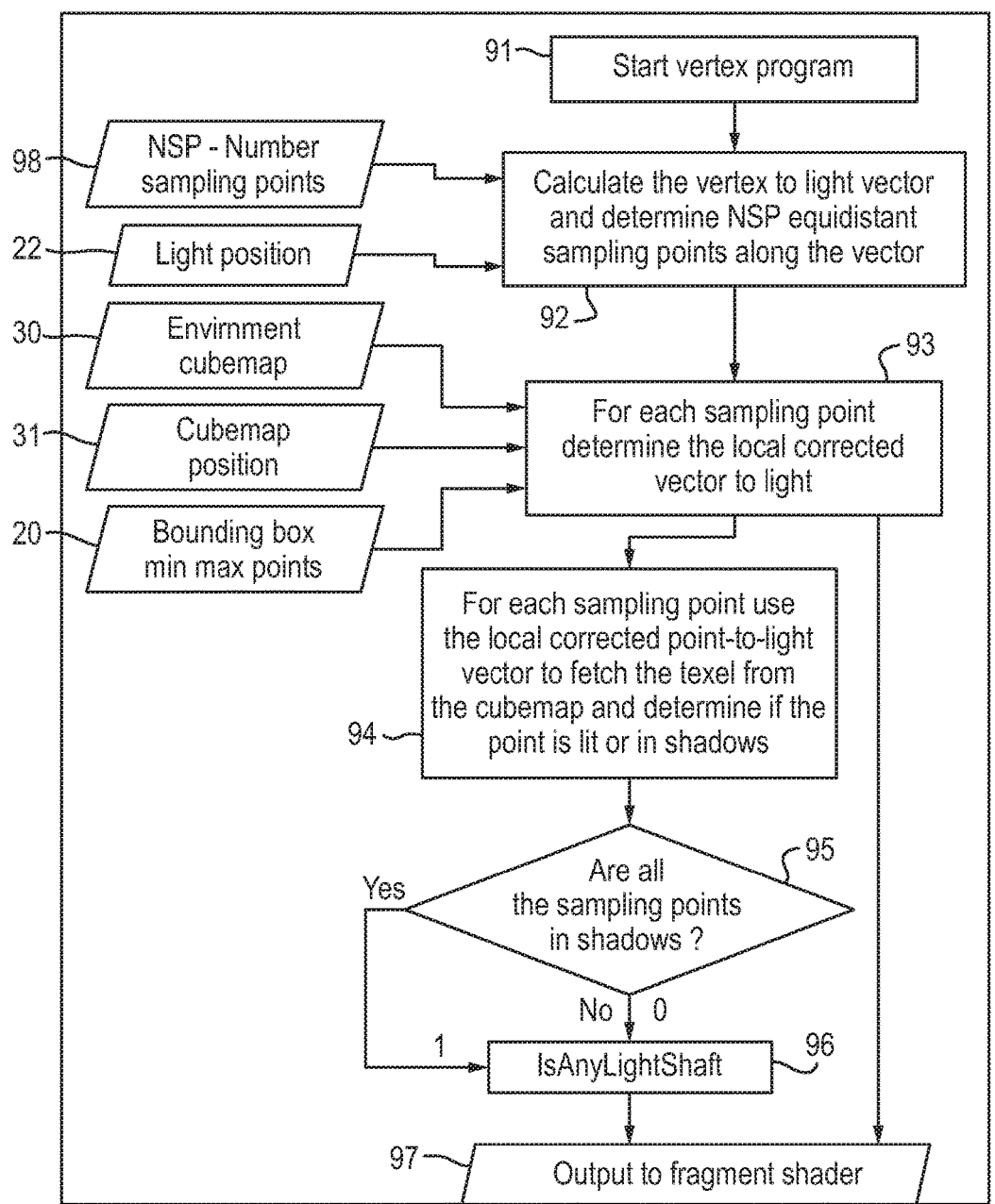
FIGS. 10 and 11 illustrate the operation of an embodiment of the technology described herein.
Figure 11:
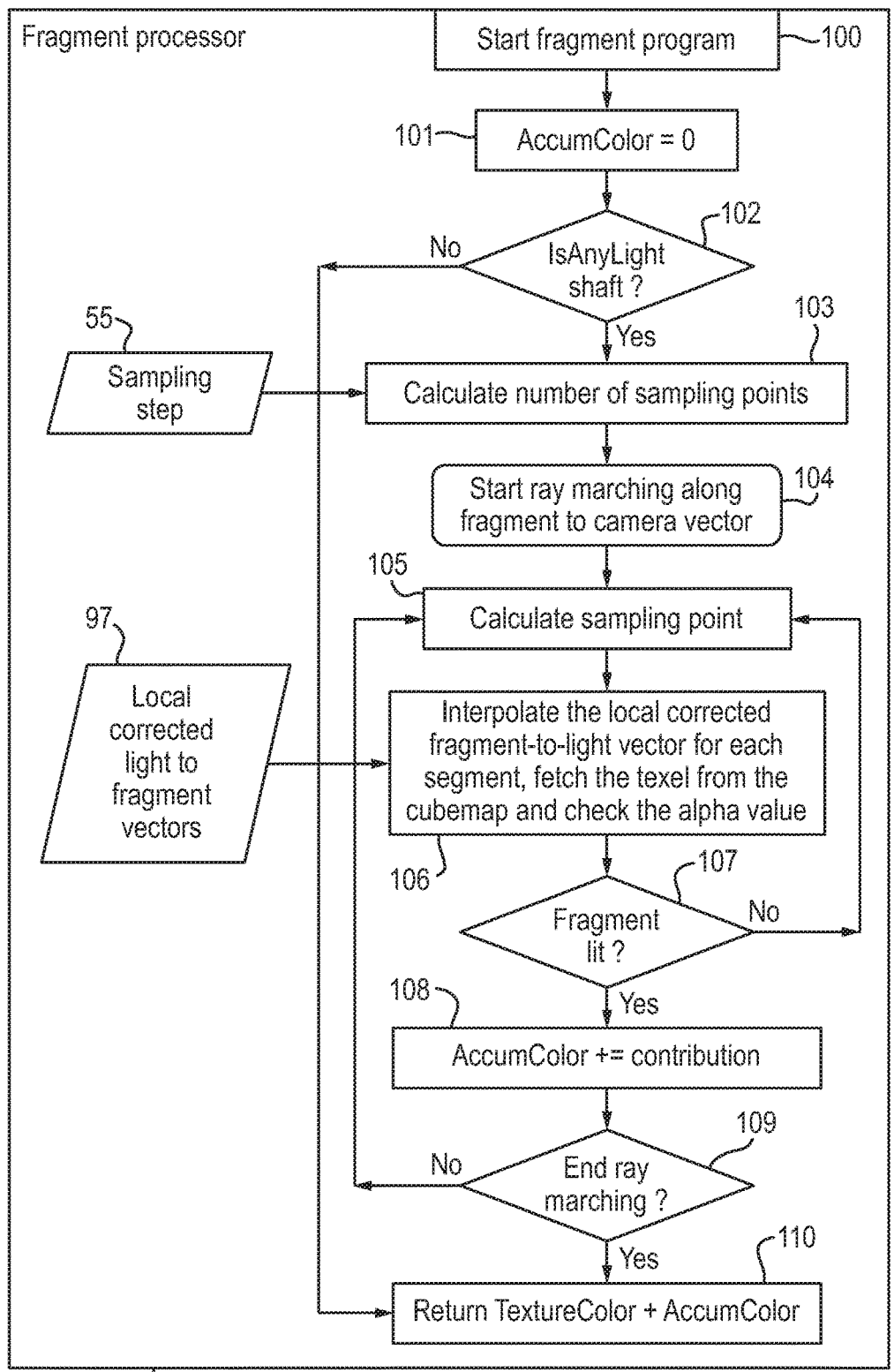

FIGS. 10 and 11 show schematically the main steps of an alternative "optimised" rendering process in accordance with an embodiment of the technology described herein.

As shown in FIG. 10, in this embodiment, after starting the vertex shader program (step 91), the vectors from the vertices of the primitive that the ("first") screen space sampling point 25 being considered relates to, to the light source 22 are determined, together with a limited set of spaced apart ("third") sampling points on the vertex to viewpoint (camera) position vectors (step 92). The third sampling points are a relatively sparse selection of sampling points, e.g. when compared with the set of intermediate ("second") sampling points ($P_1, P_2, \ldots P_n$). These processes use the desired number 98 of third sampling points and the position of the light source 22 as inputs.

For each ("third") sampling point on the vertex to viewpoint (camera) vectors, a texture sampling vector is determined for that sampling point (step 93), where the texture sampling vector is the vector that would be used to sample the cube texture 30 for the corresponding third sampling position. Thus, a set of texture sampling vectors is determined. Each texture sampling vector is in an embodiment a "locally corrected" such vector, and is accordingly determined in a manner corresponding to that described with reference to FIG. 8. As shown in FIG. 10, this step uses as its inputs the environment cube texture 30, the reference position 31 for the cube texture and the minimum and maximum extents of the bounding box 20.

Next, for each ("third") sampling point, the cube texture 30 is sampled using the corresponding determined texture sampling vector to determine an alpha value for the third sampling point in question, and the sampled alpha value is used to determine whether or not the sampling point in question is lit by the light source 22 (step 94). This will be the case where the alpha value is not equal to "1".

Once this process has been completed for some or all of the set of ("third") sampling points, it is then determined whether all of the sampling points are in shadow (i.e. are not lit by the light source 22) (step 95). Where this is the case for all third sampling points on the vertex to viewpoint (camera) vectors, it is assumed that no light shaft is present. Where this is not the case, it is determined that a light shaft is present (step 96). The results of this determination are then output to the fragment shader together with the set of texture sampling vectors (step 97). The process is then continued in the fragment shader 53.

As shown in FIG. 11, after starting the fragment shading program (step 100), a colour contribution ("AccumColour") parameter is initialised to zero (step 101) and the results of the determination of step 96 are used to determine whether or not some or all of the fragment processing operations can be bypassed (step 102), e.g. since it is assumed that no light shaft is present. Where a light shaft is present, the process then continues to determine an appropriate colour contribution.

Thus, the number n of required ("second") intermediate sampling points ($P_1, P_2, \ldots P_n$) on the sampling point to viewpoint (camera) vector 26 are firstly determined using as an input a sampling step 55 (which may be set as desired) (step 103).

The "ray marching" process along the screen space sampling point to viewpoint (camera) vector 26 is then started (step 104), and for each ("second") intermediate sampling point 27 on the screen space sampling point to viewpoint (camera) vector 26, the position of that intermediate sampling point 27 is determined (step 105). Next, a vector 29 to be used to sample the cube texture 30 is determined, and the cube texture 30 is sampled using that vector 29 to determine an alpha value for the intermediate sampling point 27 in question (step 106).

As shown in FIG. 11, in this "optimised" embodiment the vector 29 to be used to sample the cube texture 30 for each ("second") intermediate sampling point 27 is determined by appropriate interpolation using the set of texture sampling vectors 97 output from the vertex shader 51.

The output alpha value is then used as appropriate to determine whether or not the intermediate sampling point 27 in question is lit by the light source 22 (step 107). Where the sampling point 27 is lit, then some colour contribution is added to the colour contribution parameter (step 108), and the next intermediate sampling point in the set of intermediate sampling points ($P_1, P_2, \ldots P_n$) on the sampling point to viewpoint (camera) vector 26 is then considered. Once all of the intermediate sampling points in the set of intermediate sampling points ($P_1, P_2, \ldots P_n$) have been considered, the ray marching process is ended (step 109).

The final value of the colour contribution parameter can then be used as desired (and as required), e.g. together with the results of one or more appropriate rendering calculations (e.g. using another texture), to determine the final colour for the screen space sampling point 25 as seen from the camera position 24 (step 110).

As shown in FIG. 5, the final colour value is then output to the frame buffer (tile buffer 10) (step 54). Again, the above processes are repeated for all of the ("first") screen space sampling points, and for all of the primitives that are to be rendered (and then for the next frame (if appropriate), and so on).

As will be appreciated by those having skill in the art, in this embodiment, the resources required for the rendering operation are reduced by effectively offloading some of the processing that would otherwise be performed on a screen space sampling point-by-screen space sampling point (fragment-by-fragment) basis in the fragment shader to the vertex shader, and then relying on (hardware) interpolation in the fragment shader in determining the appropriate colours for the screen space sampling point 25.

Various modifications, additions and alternatives to the above-described embodiments of the technology described herein would be possible, if desired.

For example, although the process has been described above with reference to the cube texture 30 storing an alpha value (a transparency value), it would be possible for the cube texture 30 to also store other data channels such as colour channels, with that colour data then also being used in the light shaft rendering process, for example to allow the effect of tinted (coloured) semi-transparent surfaces to be simulated (e.g. stained glass windows, etc.).

The information could also be stored in and sampled from a separate texture, that may e.g. correspond to (be fitted to) the transparent or semi-transparent parts 21 of the bounding volume 20.

It would be possible to reduce the number of second sampling points ($P_1, P_2, \ldots P_n$) on the first sampling point to viewpoint vector 26 for which a transparency factor is determined. For example, where it is determined (in step 94) that light from the light source 22 does not fall on adjacent third sampling points or adjacent sets of third sampling points, then it may be assumed that light from the light source 22 does not fall on any second sampling points between the adjacent third sampling points or sets of third sampling points. Thus, in this case it will not be necessary to determine transparency parameters for these second sampling points, and instead transparency parameters indicating that no light falls on the second sampling points in question (e.g. "1") can be used.

Each colour contribution for each lit ("second") intermediate sampling point could be a constant colour contribution (e.g. depending on the properties such as colour, intensity, position, etc. of the light source 22), and/or could depend on the value of the transparency parameter. For example, the determined alpha value for each intermediate sampling point could be used as or to derive a multiplying factor (and used e.g. to modify the colour for the light source).

It would also be possible to take into account the effects of different strengths of light-scattering, absorption, and/or attenuation, etc., at different locations within the bounding volume, e.g. to simulate the effects of fog having a varying density within the bounding volume. For example, a light-scattering, absorption or attenuation parameter indicative of the light-scattering, absorption or attenuation strength at each intermediate sampling point could be determined from a media "density" function defined for the bounding volume 20, and used to modify the colour contribution for the intermediate sampling point (e.g. by using the light-scattering, absorption or attenuation parameter as or to derive a multiplying factor).

The effects of non-uniformity in the light shaft could be simulated, e.g. by sampling a noise texture (i.e. a texture comprising a random array of transparency (alpha) values) for transparent and/or semi-transparent regions 21 of the bounding volume 20, and using the sampled value to modify the colour contribution(s) for the intermediate sampling point in question. The noise texture could be integrated into the transparency-indicating graphics texture or could be provided as a separate texture that may e.g. correspond to (be fitted to) the transparent or semi-transparent parts 21 of the bounding volume 20.

The noise texture could also be animated, e.g. to simulate the effects of moving objects (e.g. particles such as dust) within the bounding volume 20 and/or moving objects (e.g. foliage, etc.) external to the bounding volume 20.

In an embodiment, the light shaft colour contributions are evaluated at a lower resolution (e.g. ¼) than the screen space sampling points of the underlying scene, and then scaled up to match, blurred (e.g. using hardware), and blended with the underlying scene. This can reduce the processing required for the light shaft determination.

It would also be possible to use different intermediate sampling point locations on the respective sampling point to viewpoint vectors 26 for adjacent screen space sampling points 25. For example, it would be possible to start the "ray marching" process from slightly different positions along adjacent first sampling point to viewpoint vectors 26, and to then use a constant intermediate sampling point spacing in the "ray marching" process, i.e. to perform interleaved sampling. As will be appreciated by those having skill in the art, this can avoid "banding" artefacts across adjacent screen space sampling points due to the quantised nature of the ray marching process.

In an embodiment, the transparency-indicating textures (thus the cube texture 30) are stored in the form of mipmaps (i.e. where multiple versions of the original texture data array, each having different levels of detail (resolution), are stored for use). In this case, each lower-resolution mipmap level is in an embodiment a downscaled (in an embodiment by a factor of 2) representation of the previous higher resolution mipmap level.

In this case, the texture sampling process in an embodiment also determines which mipmap level or levels (the level of detail) to sample the transparency-indicating texture at. The mipmap level(s) (level of detail) to use is in an embodiment selected based on the distance from the sampling point being considered to the intersection point on the bounding volume of the vector from the sampling point to the light source. Other arrangements would, of course, be possible.

Although the present embodiment has been described with respect to a single external light source 22, the cube texture 30 and bounding volume 20 can be used to determine and simulate the effect of lights shafts from any arbitrary number of light sources that are external to the bounding volume 20. In this case, the above operation described with reference to the light source 22 would be repeated for each additional external light source separately, with the determined light shaft effects for each external light source then being combined appropriately to provide an overall light shaft effect for all the external light sources at the sampling point being considered.

It would also be possible to combine the process of the technology described herein with other light shaft-simulating techniques, for example where there are also light sources within the bounding volume 20, and/or with any one or more other rendering techniques, as desired, such as techniques for taking account of the effect of shadows and/or reflections, etc.

In an embodiment, where it is desired to render both light shafts and shadows and/or reflections in a scene, then the same cubemap that is used to take account of the effect of lights shafts is also used to take account of the effect of shadows (to render shadows using a local cubemap technique) and/or reflections (to render reflections using a local cubemap technique). This represents a particularly convenient and efficient technique for rendering complex and high quality scenes. As shown, for example, in FIG. 9, where the same cubemap is used for determining both the effects of shadows and light shafts, the rendered shadow(s) and light shaft(s) will appropriately match in the scene.

As can be seen from the above, the technology described herein, in its embodiments at least, provides an effective, and bandwidth efficient, mechanism for simulating the effect of light shafts, that can use a "static" texture map for determining the effect of light shafts, rather than having to use (and constantly regenerate) "dynamic" texture maps for that purpose. This then allows higher quality light shaft effects to be achieved in a bandwidth and processing efficient manner.

This is achieved, in embodiments of the technology described herein at least, by defining a texture map that indicates the transparency of the surface of a bounding volume within a scene to be rendered, and then sampling that texture map to determine transparency values for sampling points along a sampling point to viewpoint (camera) vector in respect of light sources that are external to the bounding volume.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing system when rendering a scene for output, in which a bounding volume representative of the volume of all or part of the scene to be rendered is defined; the method comprising:
for at least one first sampling point on or within the bounding volume, determining a colour to be used to represent that sampling point as seen from a viewpoint position for the scene by:
for each of plural second sampling points along a vector from the first sampling point to the viewpoint position for the scene, determining a transparency parameter indicative of the amount of light that falls on the second sampling point from a light source that is external to the bounding volume by:
determining a vector to be used to sample a graphics texture that represents the transparency of the surface of the bounding volume in the scene; and
using the determined vector to sample the graphics texture to determine a transparency parameter value for the light source for the second sampling point; and
using the determined transparency parameter values for each of the plural second sampling points to determine the colour to be used to represent the first sampling point as seen from the viewpoint position for the scene;
wherein the vector to be used to sample the transparency representing graphics texture is determined by:
determining the position on the bounding volume intersected by a vector from the second sampling point to the light source; and
using the intersection position to determine the vector to be used to sample the graphics texture.

2. The method of claim 1, wherein:
using the determined intersection position on the bounding volume to determine the vector to be used to sample the transparency representing graphics texture comprises:
using the determined intersection position on the bounding volume to determine a vector to the determined intersection point from a reference position that the texture is defined with respect to; and
the method further comprises:
then using the determined vector from the reference position to the determined intersection point to sample the transparency-indicating texture.

3. The method of claim 1, wherein the vector to be used to sample the transparency representing graphics texture is determined by:
determining a set of texture sampling vectors; and
determining the vector to be used to sample the transparency representing graphics texture by interpolating using vectors of the set of texture sampling vectors.

4. The method of claim 3, wherein each texture sampling vector of the set of texture sampling vectors is determined by:
determining the position on the bounding volume intersected by a vector from a third sampling point to the light source; and
using the intersection position to determine the texture sampling vector.

5. The method of claim 4, wherein the third sampling points comprise selected sampling points along the vectors from the vertices of a primitive that the first sampling point being considered relates to the viewpoint position.

6. The method of claim 4, further comprising:
determining, for at least some texture sampling vectors of the set of texture sampling vectors, whether light from the light source falls on the corresponding third sampling point; and
determining whether further processing can be omitted for one or more first and/or second sampling points on the basis of the determination.

7. The method of claim 1, further comprising:
for at least one second sampling point, sampling a noise texture to determine a noise texture value; and
using the sampled noise texture value in determining the colour to be used to represent the first sampling point as seen from the viewpoint position for the scene.

8. The method of claim 7, further comprising animating the noise texture.

9. The method of claim 1, wherein:
the determined transparency parameter values for each of the plural second sampling points are used to determine a colour contribution to the colour to be used to represent the first sampling point as seen from the viewpoint position for the scene; and wherein the method comprises:
determining plural such colour contributions for the scene; and
determining plural colours to be respectively used to represent each of plural first sampling points on or within the bounding volume as seen from the viewpoint position for the scene;
wherein the colour contributions are determined at a lower resolution than are the colours to be used to represent each of the plural first sampling points.

10. The method of claim 1, further comprising determining for a first sampling point on or within the bounding volume a colour to be used to represent that first sampling point as seen from the viewpoint position for the scene by:
for each of plural second sampling points along a vector from the first sampling point to the viewpoint position for the scene, determining a transparency parameter indicative of the amount of light that falls on the second sampling point from each of plural light sources that are external to the bounding volume.

11. A graphics processing unit comprising:
processing circuitry configured to, for at least one first sampling point on or within a bounding volume representative of the volume of all or part of the scene to be rendered, determine a colour to be used to represent that sampling point as seen from a viewpoint position for the scene by:
for each of plural second sampling points along a vector from the first sampling point to the viewpoint position for the scene, determining a transparency parameter indicative of the amount of light that falls on the second sampling point from a light source that is external to the bounding volume by:
determining a vector to be used to sample a graphics texture that represents the transparency of the surface of the bounding volume in the scene; and
using the determined vector to sample the graphics texture to determine a transparency parameter value for the light source for the second sampling point; and
using the determined transparency parameter values for each of the plural second sampling points to determine the colour to be used to represent the first sampling point as seen from the viewpoint position for the scene;
wherein the processing circuitry is configured to determine the vector to be used to sample the transparency representing graphics by:
determining the position on the bounding volume intersected by a vector from the second sampling point to the light source; and
using the intersection position to determine the vector to be used to sample the graphics texture.

12. The graphics processing unit of claim 11, wherein the processing circuitry is configured to:
use the determined intersection position on the bounding volume to determine the vector to be used to sample the transparency representing graphics texture by using the determined intersection position on the bounding volume to determine a vector to the determined intersection point from a reference position that the texture is defined with respect to; and to:
then use the determined vector from the reference position to the determined intersection point to sample the transparency-indicating texture.

13. The graphics processing unit of claim 11, wherein the processing circuitry is configured to determine the vector to be used to sample the transparency representing graphics texture by:
determining a set of texture sampling vectors; and
determining the vector to be used to sample the transparency representing graphics texture by interpolating using vectors of the set of texture sampling vectors.

14. The graphics processing unit of claim 13, wherein the processing circuitry is configured to determine each texture sampling vector of the set of texture sampling vectors by:
determining the position on the bounding volume intersected by a vector from a third sampling point to the light source; and
using the intersection position to determine the texture sampling vector.

15. The graphics processing unit of claim 14, wherein the third sampling points comprise selected sampling points along the vectors from the vertices of a primitive that the first sampling point being considered relates to the viewpoint position.

16. The graphics processing unit of claim 14, wherein the processing circuitry is configured to:
determine, for at least some texture sampling vectors of the set of texture sampling vectors, whether light from the light source falls on the corresponding third sampling point; and
determine whether further processing can be omitted for one or more first and/or second sampling points on the basis of the determination.

17. The graphics processing unit of claim 11, wherein the processing circuitry is configured to:
for at least one second sampling point, sample a noise texture to determine a noise texture value; and
use the sampled noise texture value in determining the colour to be used to represent the first sampling point as seen from the viewpoint position for the scene.

18. The graphics processing unit of claim 17, wherein the processing circuitry is configured to:
animate the noise texture.

19. The graphics processing unit of claim 11, wherein the processing circuitry is configured to:
use the determined transparency parameter values for each of the plural second sampling points to determine a colour contribution to the colour to be used to represent the first sampling point as seen from the viewpoint position for the scene;
determine plural such colour contributions for the scene; and
determine plural colours to be respectively used to represent each of plural first sampling points on or within the bounding volume as seen from the viewpoint position for the scene;
wherein the colour contributions are determined at a lower resolution than are the colours to be used to represent each of the plural first sampling points.

20. The graphics processing unit of claim 11, wherein the processing circuitry is configured to:

determine for a first sampling point on or within the bounding volume a colour to be used to represent that first sampling point as seen from the viewpoint position for the scene by:

for each of plural second sampling points along a vector from the first sampling point to the viewpoint position for the scene, determining a transparency parameter indicative of the amount of light that falls on the second sampling point from each of plural light sources that are external to the bounding volume.

21. A non-transitory computer readable storage medium storing computer software code which when executing on a processor performs a method of operating a graphics processing system when rendering a scene for output, in which a bounding volume representative of the volume of all or part of the scene to be rendered is defined; the method comprising:

for at least one first sampling point on or within the bounding volume, determining a colour to be used to represent that sampling point as seen from a viewpoint position for the scene by:

for each of plural second sampling points along a vector from the first sampling point to the viewpoint position for the scene, determining a transparency parameter indicative of the amount of light that falls on the second sampling point from a light source that is external to the bounding volume by:

determining a vector to be used to sample a graphics texture that represents the transparency of the surface of the bounding volume in the scene; and using the determined vector to sample the graphics texture to determine a transparency parameter value for the light source for the second sampling point; and using the determined transparency parameter values for each of the plural second sampling points to determine the colour to be used to represent the first sampling point as seen from the viewpoint position for the scene;

wherein the vector to be used to sample the graphics texture is determined by:

determining the position on the bounding volume intersected by a vector from the second sampling point to the light source; and using the intersection position to determine the vector to be used to sample the graphics texture.

* * * * *